United States Patent
Chae

(10) Patent No.: US 11,081,109 B2
(45) Date of Patent: Aug. 3, 2021

(54) SPEECH PROCESSING METHOD USING ARTIFICIAL INTELLIGENCE DEVICE

(71) Applicant: LG ELECTRONICS INC., Seoul (KR)

(72) Inventor: Jonghoon Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 130 days.

(21) Appl. No.: 16/548,568

(22) Filed: Aug. 22, 2019

(65) Prior Publication Data

US 2019/0378509 A1 Dec. 12, 2019

(30) Foreign Application Priority Data

Jul. 22, 2019 (KR) .......................... 10-2019-0088096

(51) Int. Cl.
*G10L 15/22* (2006.01)
*G10L 15/26* (2006.01)

(52) U.S. Cl.
CPC .............. *G10L 15/22* (2013.01); *G10L 15/26* (2013.01); *G10L 2015/223* (2013.01); *G10L 2015/225* (2013.01)

(58) Field of Classification Search
CPC ...................................................... G10L 15/22
See application file for complete search history.

(56) References Cited

U.S. PATENT DOCUMENTS

2006/0184277 A1\* 8/2006 Decuir .................... G10L 17/00 700/245
2009/0268882 A1 10/2009 Lee et al.

(Continued)

FOREIGN PATENT DOCUMENTS

JP 2011147052 7/2011
JP 2016133557 7/2016

(Continued)

OTHER PUBLICATIONS

Korean Intellectual Property Office Application Serial No. 10-2019-0088096, Notice of Allowance dated Nov. 30, 2020, 2 pages.

*Primary Examiner* — Feng-Tzer Tzeng
(74) *Attorney, Agent, or Firm* — Lee, Hong, Degerman, Kang & Waimey

(57) ABSTRACT

Provided is a speech processing method using an AI device. The speech processing method using an AI device according to an embodiment of the present invention includes receiving a speech command of a speaker, determining a recipient of the speech command by performing a speech recognition operation on the speech command, checking whether the recipient receives feedback corresponding to the speech command, selecting a second AI device which is closest to the recipient based on pre-stored positional information of a plurality of AI devices in a specific space and positional information of the recipient by obtaining the positional information of the recipient if there is no feedback, and transmitting a notification message notifying the speech command to the second AI device. As a result, the speech command of the speaker can be successfully transmitted to a recipient when the recipient does not receive the speech command of the speaker.

According to the present invention, at least one of an autonomous vehicle, a user terminal, and a server may be linked with an artificial intelligence module, a drone (unmanned aerial vehicle (UAV)), a robot, an augmented reality (AR) device, a virtual reality (VR) device, devices related to 5G services and the like.

20 Claims, 12 Drawing Sheets

(56) References Cited

U.S. PATENT DOCUMENTS

2011/0270609 A1    11/2011  Jones et al.
2013/0073293 A1*   3/2013   Jang ........................ G10L 15/22
                                                        704/275

FOREIGN PATENT DOCUMENTS

KR    1020150085145    7/2015
KR     102026479       9/2019
WO    2018198791      11/2018

* cited by examiner ured by the speaker; determining at least one specific
SPEECH PROCESSING METHOD USING ARTIFICIAL INTELLIGENCE DEVICE Pursuant to 35 U.S.C. § 119(a), this application claims the benefit of earlier filing date and right of priority to Korean Patent Application No. 10-2019-0088096, filed on Jul. 22, 2019, the contents of which are hereby incorporated by reference herein in its entirety.

BACKGROUND OF THE INVENTION

Field of the Invention

The present invention relates to a speech processing method using an artificial intelligence device, and more particularly, to a speech processing method and device for transmitting a speech command based on whether a recipient responds to a speech command of a speaker.

Related Art

A speech recognition device is a device that performs speech recognition. The speech recognition device may recognize an utterance of a user receiving a speech command to obtain a speech signal, and analyze the speech signal to perform a specific action.

When a specific speaker and a plurality of recipients exist in a specific space, a speech command that the speaker utters to the plurality of recipients may be difficult to be transmitted to the plurality of recipients. Therefore, there is a need to smoothly transmit the speech command to the plurality of recipients.

The present invention relates to a speech processing method using a speech recognition-based artificial intelligence (AI) device that allows a speech command to be smoothly transmitted to a plurality of recipients even when the speech command that a specific speaker utters to the plurality of recipients in a specific space is difficult to be transmitted to the plurality of recipients.

SUMMARY OF THE INVENTION

The present invention addresses the above-described needs and/or problems.

The present invention also provides a method for allowing a speech command of a speaker to be successfully transmitted to a recipient when the recipient does not receive the speech command of the speaker.

The present invention also provides a method for allowing an AI device to be able to recognize a recipient of a speech command when the recipient does not receive the speech command of the speaker.

The present invention also provides a method for allowing an AI device to grasp a response of a recipient to a speech command when the recipient does not receive the speech command of the speaker.

The present invention also provides a method for allowing an AI device to select an AI device closest to a recipient when the recipient does not receive the speech command of the speaker.

Objects of the present invention are not limited to the above-mentioned objects. That is, other objects that are not mentioned may be obviously understood by those skilled in the art to which the present invention pertains from the following description.

In an aspect, a speech processing method using an AI device in a space in which a speaker, at least one recipient who receives a speech command uttered by the speaker, and a plurality of AI devices which perform a speech interaction with the speaker and the at least one recipient, respectively, are positioned is provided. The speech processing method using an AI device includes: receiving the speech command uttered by the speaker; determining at least one specific recipient of the speech command by performing a speech recognition operation on the received speech command; checking whether to receive at least one feedback corresponding to the speech command from the at least one specific recipient; obtaining positional information of a recipient who does not transmit the at least one feedback among the at least one specific recipients when there is feedback which is not received among the at least one feedbacks; selecting at least one second AI device closest to a position of a recipient who does not transmit the at least one feedback based on the pre-stored positional information of the plurality of AI devices in the space and the positional information of the recipient who does not transmit the at least one feedback; and transmitting a notification message notifying that there is the speech command to the at least one second AI device.

The AI device may be an AI speaker.

The determining of the at least one specific recipient may further include: performing a speech to text (SST) conversion on the speech command; and extracting the at least one specific recipient receiving the speech command from the converted text.

The checking whether to receive the at least one feedback may further include recognizing feedback utterance from the at least one specific recipient, and it may be checked based on a pre-stored speech characteristic of the at least one specific recipient whether the at least one feedback is received from the at least one specific recipient.

The speech characteristic may further include at least one of a speech size, a speech height, an accent, and a speech tone of the at least one specific recipient.

The notification message may further include an alarm notifying that there is no feedback for the speech command.

The notification message may include the same specific command as the speech command, and the specific command may be a result of performing automated speech recognition (ASR) on the speech command or speech data itself of the speech command.

The speech processing method using an AI device may further include: transmitting, to the at least one second AI device, a control signal to output the notification message through an output unit of the at least one second AI device.

The output unit may include at least one of a display and a speaker.

The positional information of the recipient who does not transmit the at least one feedback may be obtained based on at least one of the speech of the recipient who does not transmit the at least one feedback, a distance from the recipient who does not transmit the at least one feedback, and sensitivity of a signal received from a device carried by the recipient who does not transmit the at least one feedback.

The speech processing method using an AI device may further include: determining whether a name of the at least one specific recipient is included in the speech command.

The speech processing method using an AI device may further include: stopping speech processing when the name of the at least one specific recipient is not included.

The speech processing method using an AI device may further include: stopping speech processing when all of the at least one feedbacks are received.

The speech processing method using an AI device may further include: determining whether the speaker utters the speech command.

The determining whether the speaker utters the speech command may further includes: comparing the pre-stored speech information of the speaker and the at least one specific recipient with the speech command.

The speech processing method using an AI device may further include: receiving downlink control information (DCI) used to schedule a transmission of the notification message from a network, in which the notification message may be transmitted to the at least one second AI device based n the DCI.

The speech processing method using an AI device may further include: performing an initial access procedure with the network based on a synchronization signal block (SSB).

The speech processing method using an AI device may further include: controlling a communication unit to transmit the notification message to an AI processor included in the at least one second AI device; and controlling the communication unit to receive AI-processed information from the AI processor.

In another aspect, an intelligent computing device supporting a speech processing method using an AI device in a space where a speaker, at least one recipient who receives a speech command uttered by the speaker, and a plurality of AI devices which perform a speech interaction with the speaker and the at least one recipient, respectively, are positioned is provided. The intelligent computing device includes: a sensing unit which includes at least one sensor; a communication unit; a processor; and a memory including an instruction executable by the processor, in which the instruction allows the processor to receive a speech command uttered by the speaker and perform a speech recognition operation on the received speech command to determine at least one specific recipient of the speech command, to check whether to receive at least one feedback corresponding to the speech command from the at least one specific recipient, to obtain positional information of a recipient who does not transmit at least one feedback among the at least one specific recipients when there is feedback which is not received among the at least one feedbacks, to select at least one second AI device closest to a position of a recipient who does not transmit the at least one feedback based on the pre-stored positional information of the plurality of AI devices in the space and the positional information of the recipient who does not transmit the at least one feedback, and to transmit a notification message notifying that the is the speech command to the at least one second AI device.

The processor controls the communication unit to transmit the notification message to an AI processor included in the at least one second AI device, and controls the communication unit to receive AI-processed information from the AI processor.

The accompanying drawings, which are included as part of the detailed description to assist understanding of the invention, illustrate embodiments of the invention and explain the technical features of the invention together with the detailed description.

DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present invention would unnecessarily obscure the gist of the present invention, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

Figure 1:
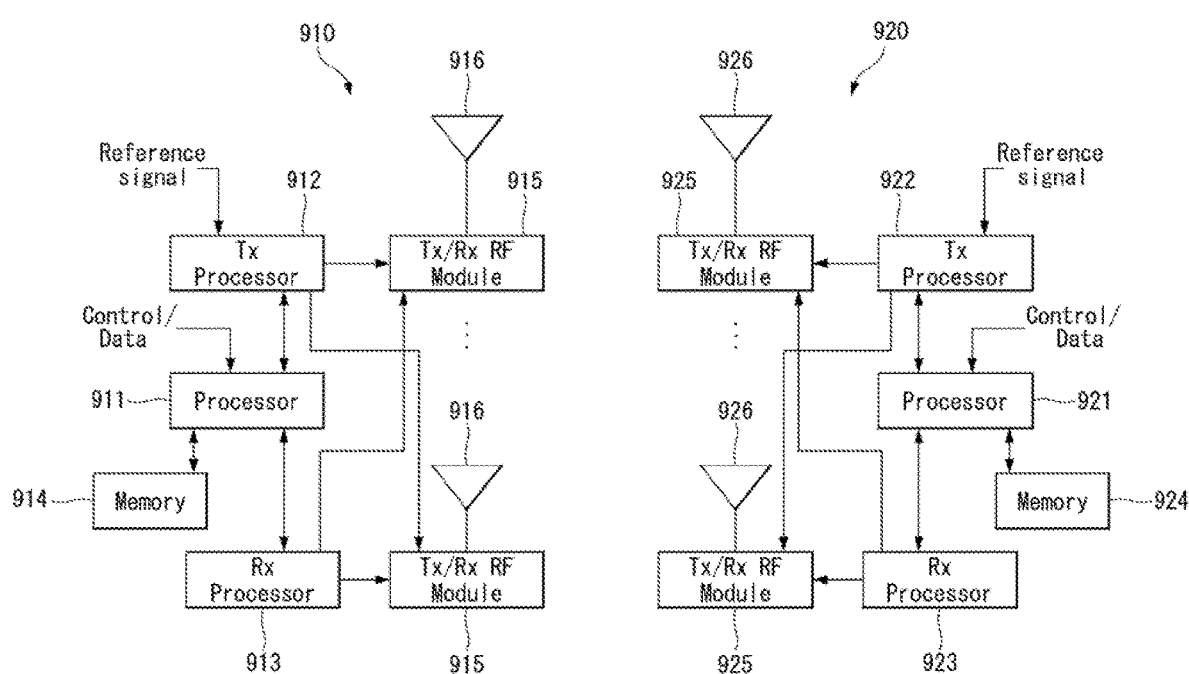
FIG. 1 illustrates one embodiment of an AI device.

FIG. 1 is a block diagram of a wireless communication system to which methods proposed in the disclosure are applicable.

Referring to FIG. 1, a device (autonomous device) including an autonomous module is defined as a first communication device (910 of FIG. 1), and a processor 911 can perform detailed autonomous operations.

A 5G network including another vehicle communicating with the autonomous device is defined as a second communication device (920 of FIG. 1), and a processor 921 can perform detailed autonomous operations.

The 5G network may be represented as the first communication device and the autonomous device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
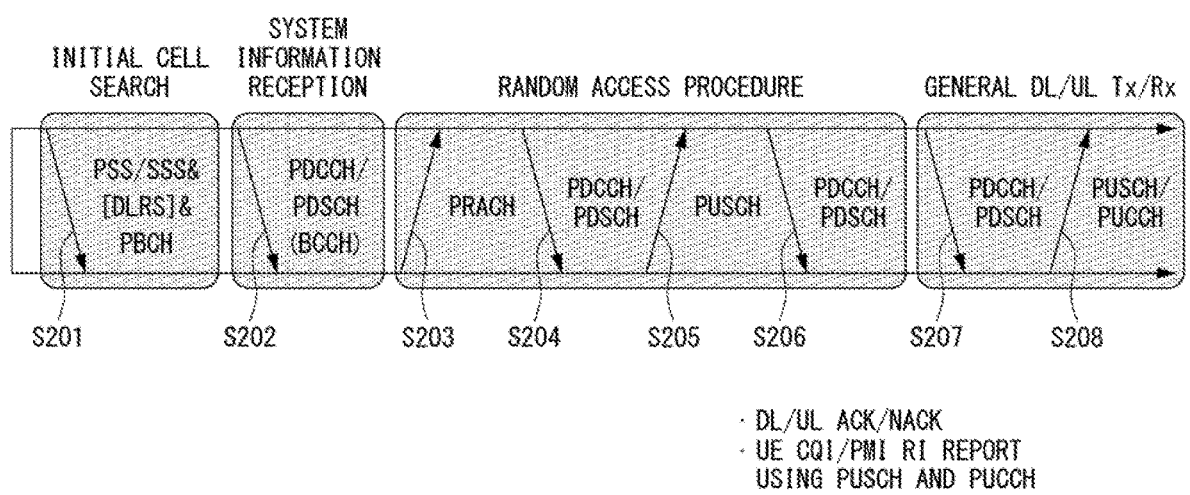
FIG. 2 illustrates a block diagram of a wireless communication system to which the methods proposed herein may be applied.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

An UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.
- The UE receives the signals on SSB resources from the BS on the basis of the CSI-S SB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

- The UE receives an NZP CSI-RS resource set IE including an RRC parameter with respect to 'repetition' from a BS through RRC signaling. Here, the RRC parameter 'repetition' is set to 'ON'.
- The UE repeatedly receives signals on resources in a CSI-RS resource set in which the RRC parameter 'repetition' is set to 'ON' in different OFDM symbols through the same Tx beam (or DL spatial domain transmission filters) of the BS.
- The UE determines an RX beam thereof
- The UE skips a CSI report. That is, the UE can skip a CSI report when the RRC parameter 'repetition' is set to 'ON'.

Next, the Tx beam determination procedure of a BS will be described.

- A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.
- The UE receives signals on resources in a CSI-RS resource set in which the RRC parameter 'repetition' is set to 'OFF' in different DL spatial domain transmission filters of the BS.
- The UE selects (or determines) a best beam.
- The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

- A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

- When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation of AI Using 5G Communication

Figure 3:
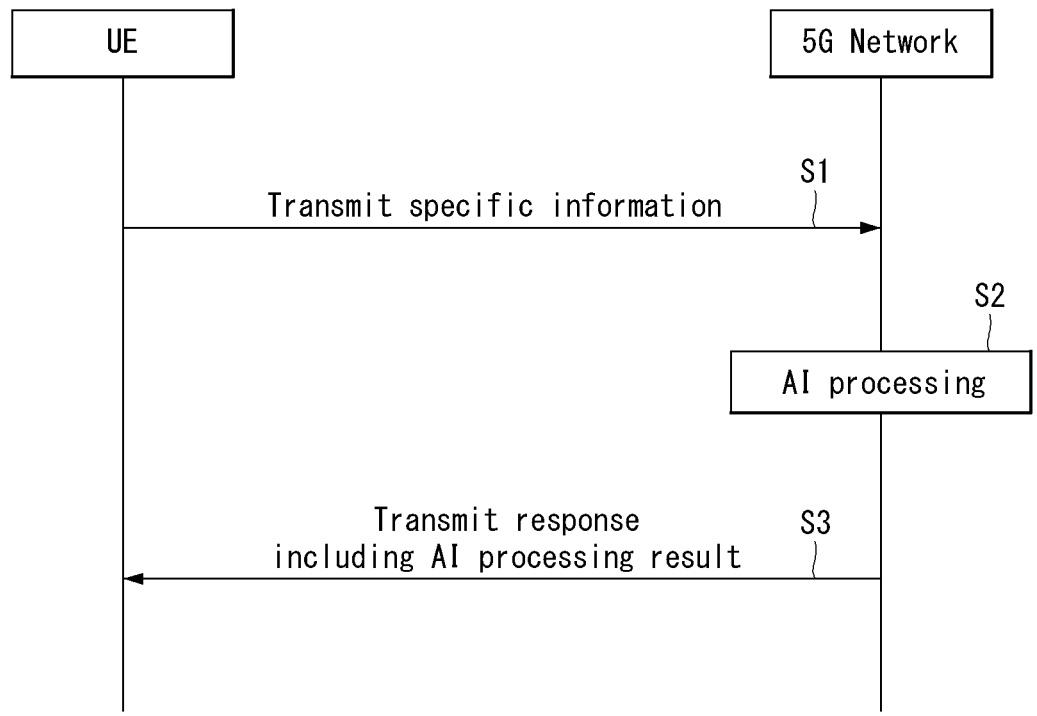
FIG. 3 illustrates an example of a signal transmission/reception method in a wireless communication system.

FIG. 3 shows an example of basic operations of an UE and a 5G network in a 5G communication system.

The UE transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the UE (S3).

G. Applied Operations Between UE and 5G Network in 5G Communication System

Hereinafter, the operation of an UE using 5G communication will be described in more detail with reference to wireless communication technology (BM procedure, URLLC, mMTC, etc.) described in FIGS. 1 and 2.

First, a basic procedure of an applied operation to which a method proposed by the present invention which will be described later and eMBB of 5G communication are applied will be described.

As in steps S1 and S3 of FIG. 3, the UE performs an initial access procedure and a random access procedure with the 5G network prior to step S1 of FIG. 3 in order to transmit/receive signals, information and the like to/from the 5G network.

More specifically, the UE performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the UE receives a signal from the 5G network.

In addition, the UE performs a random access procedure with the 5G network for UL synchronization acquisition and/or UL transmission. The 5G network can transmit, to the UE, a UL grant for scheduling transmission of specific information. Accordingly, the UE transmits the specific information to the 5G network on the basis of the UL grant. In addition, the 5G network transmits, to the UE, a DL grant for scheduling transmission of 5G processing results with respect to the specific information. Accordingly, the 5G network can transmit, to the UE, information (or a signal) related to remote control on the basis of the DL grant.

Next, a basic procedure of an applied operation to which a method proposed by the present invention which will be described later and URLLC of 5G communication are applied will be described.

As described above, an UE can receive DownlinkPreemption IE from the 5G network after the UE performs an initial access procedure and/or a random access procedure with the 5G network. Then, the UE receives DCI format 2_1 including a preemption indication from the 5G network on the basis of DownlinkPreemption IE. The UE does not perform (or expect or assume) reception of eMBB data in resources (PRBs and/or OFDM symbols) indicated by the preemption indication. Thereafter, when the UE needs to transmit specific information, the UE can receive a UL grant from the 5G network.

Next, a basic procedure of an applied operation to which a method proposed by the present invention which will be described later and mMTC of 5G communication are applied will be described.

Description will focus on parts in the steps of FIG. 3 which are changed according to application of mMTC.

In step S1 of FIG. 3, the UE receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the UE transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present invention which will be described later and applied or can complement the methods proposed in the present invention to make technical features of the methods concrete and clear.

Figure 4:
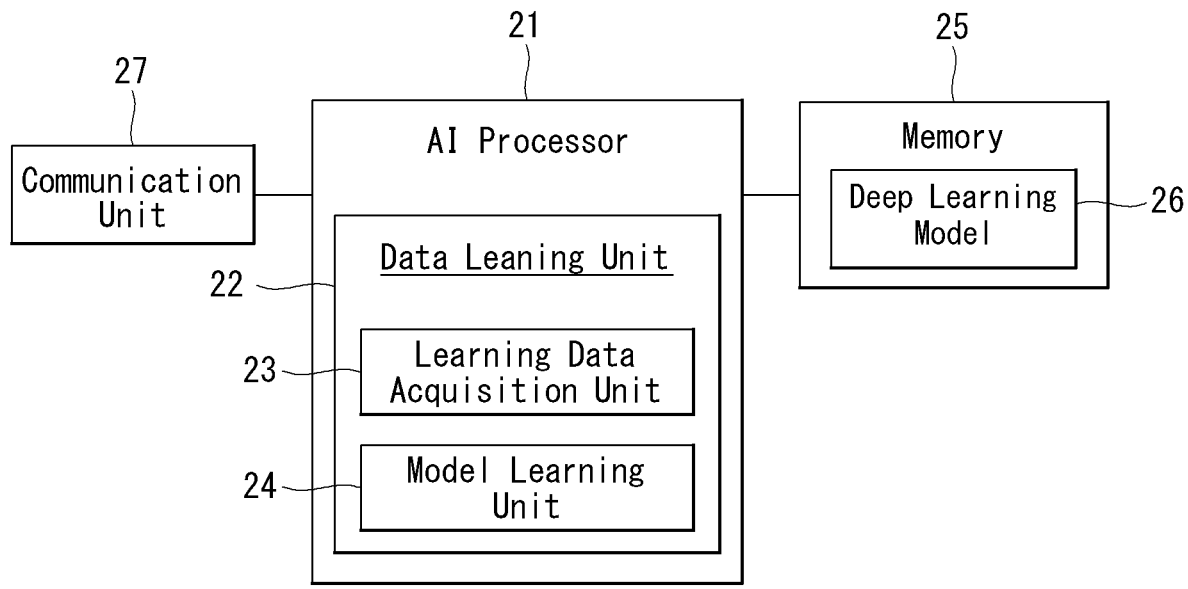
FIG. 4 illustrates an example of basic operations of a user terminal and a 5G network in a 5G communication system.

FIG. 4 is a block diagram of an AI device according to an embodiment of the present invention.

An AI device 20 may include an electronic device including an AI module that can perform AI processing, a server including the AI module, or the like. Further, the AI device 20 may be included as at least one component of the vehicle 10 shown in FIG. 1 to perform together at least a portion of the AI processing.

The AI processing may include all operations related to driving of the vehicle 10 shown in FIG. 4. For example, an UE can perform operations of processing/determining, and control signal generating by performing AI processing on sensing data or driver data. Further, for example, an UE can perform autonomous driving control by performing AI processing on data acquired through interaction with other electronic devices included in the vehicle.

The AI device 20 may include an AI processor 21, a memory 25, and/or a communication unit 27.

The AI device 20, which is a computing device that can learn a neural network, may be implemented as various electronic devices such as a server, a desktop PC, a notebook PC, and a tablet PC.

The AI processor 21 can learn a neural network using programs stored in the memory 25. In particular, the AI processor 21 can learn a neural network for recognizing data related to vehicles. Here, the neural network for recognizing data related to vehicles may be designed to simulate the brain structure of human on a computer and may include a plurality of network nodes having weights and simulating the neurons of human neural network. The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks (CNN), recurrent neural networks (RNN), a restricted boltzmann machine (RBM), deep belief networks (DBN), and a deep Q-network, and can be applied to fields such as computer vision, voice recognition, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 can store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. of data by the AI processor 21 can be performed. Further, the memory 25 can store a neural network model (e.g., a deep learning model 26) generated through a learning algorithm for data classification/recognition according to an embodiment of the present invention.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by acquiring learning data to be used for learning and by applying the acquired learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data leaning unit 22 is implemented as a software module (or a program module including instructions), the software module may be stored in non-transitory computer readable media that can be read through a computer. In this case, at least one software module may be provided by an OS (operating system) or may be provided by an application.

The data learning unit 22 may include a learning data acquiring unit 23 and a model learning unit 24.

The learning data acquiring unit 23 can acquire learning data required for a neural network model for classifying and recognizing data. For example, the learning data acquiring unit 23 can acquire, as learning data, vehicle data and/or sample data to be input to a neural network model.

The model learning unit 24 can perform learning such that a neural network model has a determination reference about how to classify predetermined data, using the acquired learning data. In this case, the model learning unit 24 can train a neural network model through supervised learning that uses at least some of learning data as a determination reference. Alternatively, the model learning data 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

When a neural network model is learned, the model learning unit 24 can store the learned neural network model in the memory. The model learning unit 24 may store the learned neural network model in the memory of a server connected with the AI device 20 through a wire or wireless network.

The data learning unit 22 may further include a learning data preprocessor (not shown) and a learning data selector (not shown) to improve the analysis result of a recognition model or reduce resources or time for generating a recognition model.

The learning data preprocessor can preprocess acquired data such that the acquired data can be used in learning for situation determination. For example, the learning data preprocessor can process acquired data in a predetermined format such that the model learning unit 24 can use learning data acquired for learning for image recognition.

Further, the learning data selector can select data for learning from the learning data acquired by the learning data acquiring unit 23 or the learning data preprocessed by the preprocessor. The selected learning data can be provided to the model learning unit 24. For example, the learning data selector can select only data for objects included in a specific area as learning data by detecting the specific area in an image acquired through a camera of a vehicle.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it can make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 27 can transmit the AI processing result by the AI processor 21 to an external electronic device.

Here, the external electronic device may be defined as an UE. Further, the AI device 20 may be defined as another vehicle or a 5G network that communicates with the UE. Meanwhile, the AI device 20 may be implemented by being functionally embedded in an autonomous module included in a vehicle. Further, the 5G network may include a server or a module that performs control related to autonomous driving.

Figure 5:
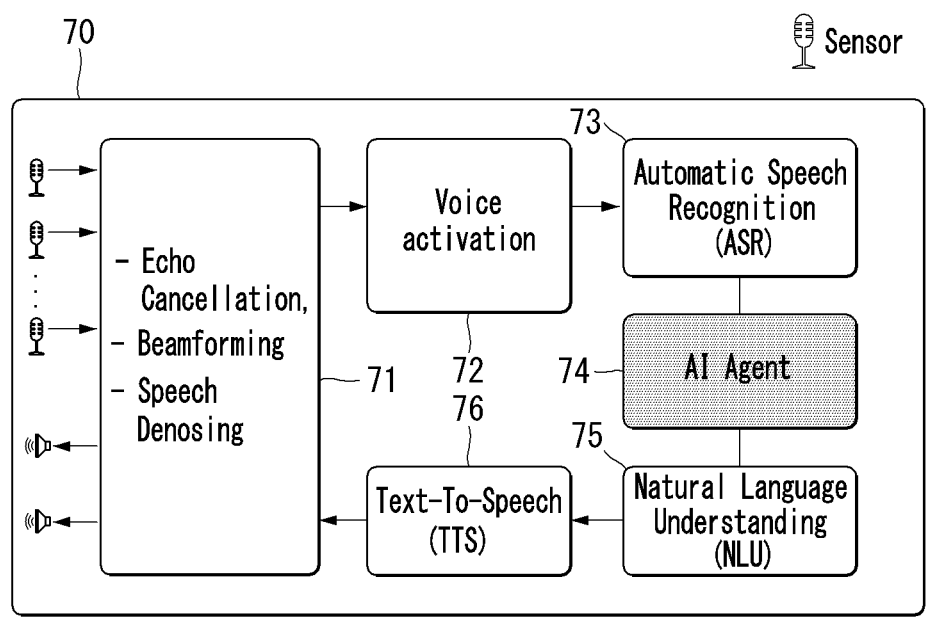
FIG. 5 is a schematic block diagram of a speech processing device using AI according to an embodiment of the present invention.

Meanwhile, the AI device 20 shown in FIG. 5 was functionally separately described into the AI processor 21, the memory 25, the communication unit 27, etc., but it should be noted that the aforementioned components may be integrated in one module and referred to as an AI module.

FIG. 5 is a schematic block diagram of a speech processing device using AI according to an embodiment of the present invention.

Referring to FIG. 5, a device 70 includes a preprocessing module 71, a voice activation module 72, an ASR module 73, an intelligent agent 74, an NLU module 75, and a TTS module 76. In addition, the device 50 may include an input module (at least one microphone) and at least one output module.

The device may be an AI device such as an AI speaker or an AI monitor, or may be various AI devices.

The ASR module 73 may convert a user speech input received from the client device 50 into textual data.

The ASR module 73 includes a front-end speech pre-processor. The front-end speech pre-processor extracts representative features from a speech input. For example, the front-end speech pre-processor performs a Fourier transform on the speech input to extract spectral features that characterize the speech input as a sequence of a representative multidimensional vector. In addition, the ASR module 73 may include one or more speech recognition models (for example, acoustic models and/or language models) and may implement one or more speech recognition engines. Examples of the speech recognition models include hidden Markov models, Gaussian-mixture models, deep neural network models, n-gram language models, and other statistical models. Examples of the speech recognition engines include dynamic time distortion based engines and weighted finite state transformers (WFST) based engines. The one or more speech recognition models and the one or more speech recognition engines may be used to process the representative features extracted by the front-end speech pre-processor in order to generate intermediate recognition results (for example, phonemes, phoneme strings, and sub-words), and ultimately text recognition results (for example, words, word strings, or sequence of tokens).

If the ASR module 73 generates the recognition results which include text strings (for example, words, a sequence of words, or a sequence of words, or a sequence of tokens), the recognition results are transferred to the natural language processing module 75 for intent inference. In some examples, the ASR module 73 generates a plurality of candidate textual representations of the speech input. Each candidate textual representation is a sequence of words or tokens corresponding to the speech input.

The NLU module 75 may grasp a user intent by performing syntactic analysis or semantic analysis. The syntactic analysis divides syntactic units (for example, words, phrases, morphemes and the like) and can grasp what syntactic elements the divided units have. The semantic analysis may be performed using semantic matching, rule matching, formula matching or the like. Accordingly, the NUL module 75 may obtain any domain, intents, or parameters required to express the intents from a user input.

The NLU module 75 may determine user intents and parameters by using a mapping rule divided into domains, intent, and parameters necessary for grasping the intent. For example, one domain (for example, alarm) may include a plurality of intents (for example, alarm setting, alarm off), and one intent may be a plurality of parameters (for example, time, the number of repetitions, alarm sound and the like). The plurality of rules may include, for example, one or more essential element parameters. The matching rule may be stored in a natural language understanding database.

The NLU module 75 grasps meaning of words extracted from a user input using linguistic features (for example, a syntactic element) such as morphemes and phrases, and matches the meaning of the grasped words with domains and intents, thereby determining a user intent. For example, the NLU module 75 may determine the user intent by calculating how many the words extracted from the user input are included in each domain and intent. According to an embodiment, the NLU module 75 may determine parameters of a user input using words which are the basis for grasping the user intent. According to an embodiment, the NLU module 75 may determine a user intent by using a natural language recognition database in which linguistic features for grasping an intent of a user input are stored. In addition, according to an embodiment, the NLU module 75 may determine a user intent using a personal language model (PLM). For example, the NLU module 75 may determine a user intent using personalized information (for example, a contact list, a music list, schedule information, social network information and the like). The personalized language model may be stored in, for example, the natural language recognition database. According to an embodiment, the ASR module 73 as well as the NLU module 75 can recognize a user's speech by referring to the personalized language model stored in the natural language recognition database.

The NLU module 75 may further include a natural language generation module (not illustrated). The natural language generation module may change designated information into a text form. The information changed into the text form may be in the form of a natural language utterance. The designated information may include, for example, information on additional input, information to guide completion of an operation corresponding to a user input, information to guide an additional input of a user or the like. The information changed into the text form may be transmitted to a client device and displayed on the display, or may be transmitted to the TTS module and changed into a speech form.

A speech synthesis module (TTS module) 76 can change information in a text form into information of a speech form. The TTS module 76 may receive the information in the text form from the natural language generation module of the NLU module 75 and may change the information in the text form into the information in the speech form. The device 70 may output the information in the speech form through a speaker.

A speech synthesis module 76 synthesizes speech output based on the provided text. For example, the results generated in the speech recognition module (ASR) 73 are in the form of a text string. The speech synthesis module 76 converts the text string into an audible speech output. The speech synthesis module 76 uses any suitable speech synthesis technique to generate a speech output from text, and includes concatenative synthesis, unit selection synthesis, diphony synthesis, and domain-specific synthesis, formant synthesis, articulatory synthesis, hidden Markov model (HMM) based synthesis, and sinewave synthesis.

In some examples, the speech synthesis module 76 is configured to synthesize individual words based on phoneme strings corresponding to words. For example, phoneme strings are associated with words in the generated text strings. Phoneme strings are stored in metadata associated with words. The speech synthesis module 76 is configured to directly process the phoneme strings in the metadata to synthesize words in a speech form.

According to an embodiment of the present invention, the device 70 may further include an AI agent 74. The intelligent agent 74 may be designed to perform at least some of the functions performed by the ASR module 73, the NLU module 75, and/or the TTS module 76 described above. In addition, the intelligent agent module 74 may also contribute to performing independent functions of the ASR module 73, the NLU module 75, and/or the TTS module 76, respectively.

The intelligent agent module 74 may perform the functions described above through deep learning. A lot of research into the deep learning (into how to make better representation techniques for any data and how to make learning models for these data) is being conducted to represent any data in a form (for example, in the case of an image, pixel information is represented by a column vector) in which a computer can recognize any data when there are any data and apply the represented data to learning. As a result of these efforts, various deep learning techniques such as deep neural networks (DNN), convolutional deep neural networks (CNN), recurrent Boltzmann machine (RNN), restricted Boltzmann machine (RBM), deep belief networks (DBN), and deep Q-network can be applied to fields such as computer vision, speech recognition, natural language processing, and speech/signal processing.

Currently, all major commercial speech recognition systems (MS Cortana, Skype Translator, Google Now, Apple Siri and the like) are based on the deep learning techniques.

In particular, the intelligent agent module 74 may perform various natural language processing procedures including machine translation, emotion analysis, and information retrieval using a deep artificial neural network structure in the natural language processing field.

The intelligent agent 74 is represented by a separate block so as to be discriminated from the ASR module 73, the NLU module 75, and the TTS module 76 for convenience of description, but the intelligent agent 62 may perform at least some or all of the functions of each of the modules.

The ASR module 73, the NLU module 75 and the TTS module 76 are included in the device 70 so that the speech processing procedures such as speech recognition and speech synthesis can be performed immediately and in real time.

Figure 6:
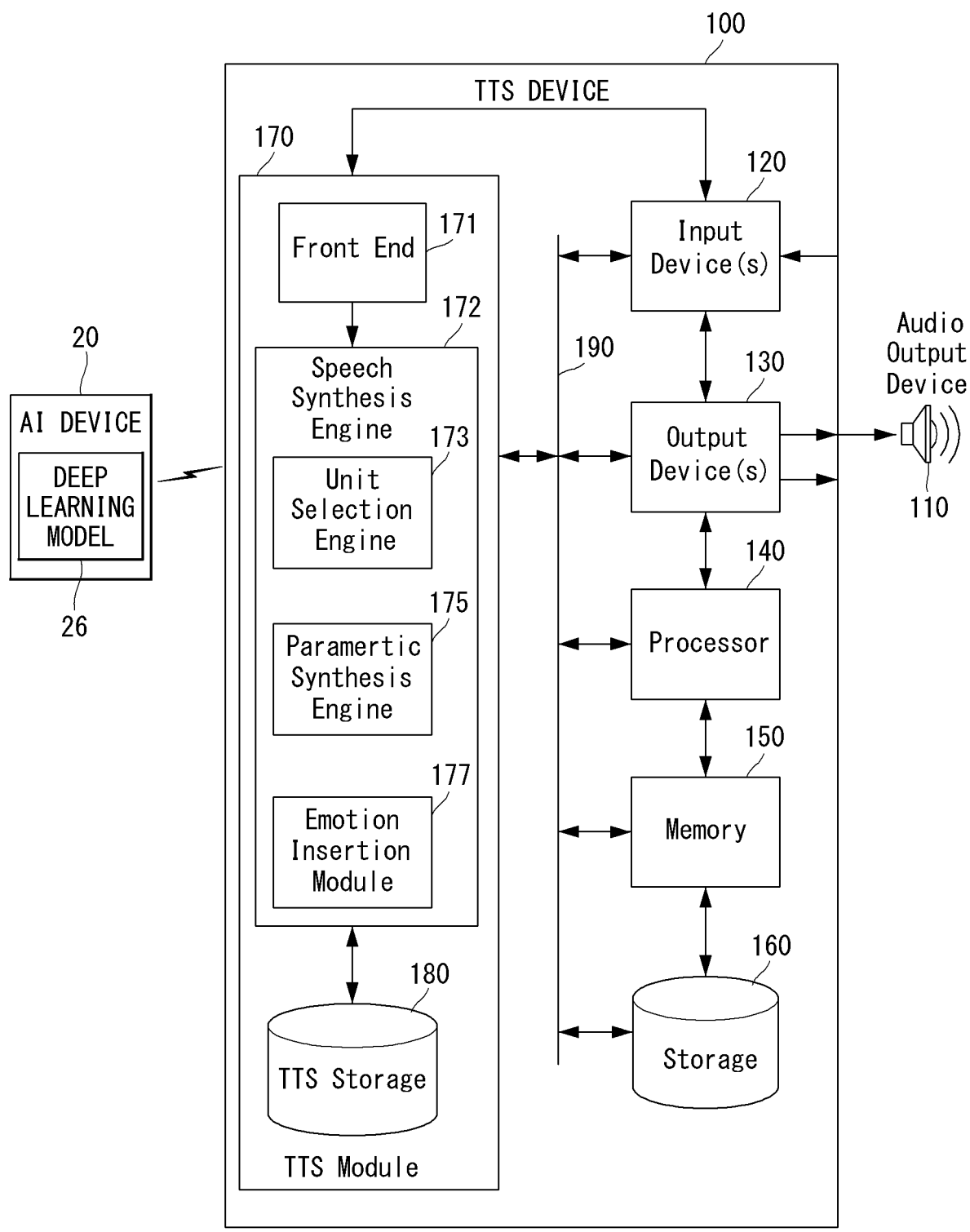
FIG. 6 is a diagram for describing a system in which a device and an AI device are linked with each other according to an embodiment of the present invention.

FIG. 6 is a diagram for describing a system in which a device and an AI device are linked with each other according to an embodiment of the present invention.

A speech synthesis device (TTS device) 100 illustrated in FIG. 6 may include an audio output device 110 for outputting speech processed by the TTS device 100 or another device.

FIG. 6 discloses the speech processing (synthesis) device (TTS Device) 100 for performing speech processing (synthesis). An embodiment of the present invention may include computer readable and computer executable instructions which may be included in the TTS device 100. Note that FIG. 6 illustrates a plurality of components included in the TTS device 100, but components not illustrated may also be included in the TTS device 100.

On the other hand, some of the components disclosed in the TTS device 100, which are a single component, may appear multiple times in one apparatus. For example, the TTS device 100 may include a plurality of input devices 120, an output device 130, or a plurality of controllers/processors 140.

A plurality of TTS devices may be applied to one speech synthesis device. In such a multiple device system, the TTS device may include different components for performing various aspects of the speech synthesis processing. The TTS device 100 shown in FIG. 5 is exemplary and may be an independent device, or may be implemented as one component of a larger device or system.

An embodiment of the present invention may be applied to a plurality of different devices and computer systems, for example, a general purpose computing system, a server-client computing system, a telephone computing system, a laptop computer, a portable terminal, a PDA, a tablet computer and the like. The TTS device 100 may be applied as one component of other apparatuses or systems, such as automated teller machines (ATMs), kiosks, a global positioning system (GPS), home appliances (for example, a refrigerator, ovens, washing machines and the like), vehicles, ebook readers, or the like, which provide a speech recognition function.

Referring to FIG. 6, the TTS device 100 may include a speech output device 110 for outputting speech processed by the TTS device 100 or another device. The speech output device 110 may include a speaker, a headphone, or other suitable components for transmitting speech. The speech output device 110 may be integrated into the TTS device 100 or may be implemented separately from the TTS device 100.

The TTS device 100 may include an address/data bus 224 for transmitting data between components of the TTS device 100. Each component in the TTS device 100 may be directly connected to other components via the bus 224. On the other hand, each component in the TTS device 100 may be directly connected to the TTS module 170.

The TTS device 100 may include a controller (processor) 140. A processor 208 may correspond to a CPU for processing data, computer readable instructions for processing data, and a memory for storing data and instructions. The memory 150 may include a volatile RAM, a non-volatile ROM, or other types of memory.

The TTS device 100 may include a storage 160 for storing data and instructions. The storage 160 may include a magnetic storage, an optical storage, a solid-state storage type and the like.

The TTS device 100 may be connected to a removable or external memory (for example, separable memory card, memory key drive, network storage and the like) via the input device 120 or the output device 130.

Computer instructions to be processed in the TTS device 100 and in the processor 140 for operating various components may be executed by the processor 140, and may be stored in the memory 150, the storage 160, the external device, or a memory or a storage included in the TTD module to be described below. Alternatively, all or some of the executable instructions may be embedded in hardware or firmware in addition to software. An embodiment of the invention may be implemented, for example, in various combinations of software, firmware and/or hardware.

The TTS device 100 includes the input device 120 and the output device 130. For example, the input device 120 may include the audio output device 110 such as a microphone, a touch input device, a keyboard, a mouse, a stylus, or other input devices. The output device 130 may include displays (visual display or tactile display), an audio speaker, a headphone, a printer, or other output devices. The input device 120 and/or the output device 130 may also include an interface for connecting external peripherals such as a universal serial bus (USB), FireWire, Thunderbolt, or other connection protocols. The input device 120 and/or the output device 130 may also include a network connection such as an Ethernet port and a modem. The input device 120 and/or the output device 130 may include wireless network communication devices such as radio frequency (RF), infrared, Bluetooth, wireless local area networks (WLAN) (WiFi and the like) or 5G networks, long term evolution (LTE) networks, WiMAN networks, and 3G networks. The TTS device 100 may include the Internet or a distributed computing environment via the input device 120 and/or the output device 130.

The TTS device 100 may include a TTS module 170 for converting textual data into speech and processing an audio waveform including the speech.

The TTS module 170 may be connected to the bus 224, the input device 120, the output device 130, the audio output device 110, the processor 140, and/or other components of the TTS device 100.

A source of the textual data may be generated by an internal component of the TTS device 100. In addition, the source of the textual data may be received from an input device, such as a keyboard, or may be transmitted to the TTS device 100 via a network connection. The text may be in the form of a sentence including text, numbers and/or punctuation which is converted into speech by the TTS module 170. The input text may also include a special annotation so as to be processed by the TTS module 170, and may indicate how a specific text should be pronounced through the special annotation. The textual data can be processed in real time or stored and processed later.

The TTS module 170 may include a front end unit 171, a speech synthesis engine 172, and a TTS storage 180. The front end unit 171 may convert input test data into a symbolic linguistic representation so that the speech synthesis engine 172 processes the input test data. The speech synthesis engine 172 may convert the input text into speech by comparing annotated phonetic units models with information stored in the TTS storage 180. The front end unit 171 and the speech synthesis engine 172 may include the embedded internal processor or memory, or may use a processor 1400 and the memory 150 included in the TTS device 100. Instructions for operating the front end unit 171 and the speech synthesis engine 172 may be included in the TTS module 170, the memory 150 and the storage 160 of the TTS device 100, or an external device.

The textual input to the TTS module 170 may be transmitted to the front end unit 171 to be processed. The front end unit 1710 may include a module for performing text normalization, linguistic analysis, and linguistic prosody generation.

The front end unit 171 processes a textual input and generates a standard text while performing the text normalization operation, thereby converting numbers, abbreviations, and symbols as they are written.

The front end unit 171 may analyze the language of the normalized text while performing the linguistic analysis operation to generate a series of phonetic units corresponding to the input text. This process may be called phonetic transcription. The phonetic units are finally combined to include symbol representations in sound units which are output by the TTS device 100 as speech. Various sound units can be used to segment text for speech synthesis. The TTS module 170 may process speech based on phonemes (individual sounds), half-phonemes, di-phones (the last half of one phoneme combined with the first half of adjacent phonemes), bi-phones (two consecutive phonemes), syllables, words, phrases, sentences, or other units. Each word may be mapped to one or more phonetic units. Such mapping may be performed using a language dictionary stored in the TTS device 100.

The linguistic analysis performed by the front end unit 171 may also include a process of checking different syntactic elements such as prefixes, suffixes, phrases, punctuation, and syntactic boundaries. Such syntactic components can be used by the TTS module 1700 to produce natural audio waveform output. The language dictionary may also include letter-to-sound rules and other tools which may be used to pronounce previously unidentified combinations of words or letters which may be generated by the TTS module 170. In general, the more the information included in the language dictionary, the higher the quality of speech output can be guaranteed.

The front end unit 171 may perform the linguistic prosody generation annotated with prosodic characteristics indicating how the final sound unit should be pronounced in the final output speech in the phonetic units based on the linguistic analysis.

The prosodic characteristics may also be referred to as acoustic features. The front end unit 171 may integrate into the TTS module 170 taking into account any prosodic annotations involving a text input while performing the operation of this step. Such acoustic features may include pitch, energy, duration and the like. The acoustic features may be applied based on prosodic models available to the TTS module 170. This prosodic model indicates how phonetic units should be pronounced in specific situations. For example, the prosodic model may take into account a phoneme's position in a syllable, a syllable's position in a word, or a word's position in a sentence or a phrase, neighboring phonetic units and the like. Like the language dictionary, the more the information of the prosodic information (prosodic model), the higher the quality of speech output can be guaranteed.

The output of the front end unit 171 may include a series of speech units annotated with the prosodic characteristics. The output of the front end unit 171 may be called a symbolic linguistic representation. The symbolic language representation may be transmitted to the speech synthesis engine 172. The speech synthesis engine 172 performs a process of converting speech into an audio waveform in order to output the speech to a user through the audio output device 110. The speech synthesis engine 172 may be configured to efficiently convert the input text into the high-quality natural speech. The High-quality speech can be configured to be pronounced as similar as possible to a human speaker.

The speech synthesis engine 172 may perform the speech synthesis using at least one or more other methods.

A unit selection engine 173 compares a recorded speech database with a the symbolic linguistic representation generated by the front end unit 171. The unit selection engine 173 matches the symbol linguistic representation with a speech audio unit in the speech database. Matching units can be selected to form a speech output and the selected matching units can be connected together. Each unit may include not only an audio waveform corresponding to a phonetic unit, such as a short .wav file of a particular sound, together with a description of various acoustic characteristics associated with the .wav file (pitch, energy, and the like), but also other information such as a position at which the speech unit is displayed on a word, a sentence or a phrase, and a neighboring speech unit.

The unit selection engine 173 may match the input text using all the information in the unit database in order to generate a natural waveform. The unit database may include an example of a plurality of speech units which provide different options to the TTS device 100 in order to connect units to each other by speech. One of the advantages of the unit selection is that natural speech output can be produced depending on the size of the database. In addition, as the size of the unit database is increased, the TTS device 100 can compose speech more and more naturally.

On the other hand, in addition to the unit selection synthesis described above, a parameter synthesis method is used to perform the speech synthesis. Parameter synthesis is performed so that synthesis parameters such as frequency, volume, and noise may be modified by the parameter synthesis engine 175, a digital signal processor, or other audio generation devices in order to generate an artificial speech waveform.

The parameter synthesis may match the symbolic linguistic representation with a desired output speech parameter using an acoustic model and various statistical techniques. The parameter synthesis can not only process speech without a large-capacity database associated with the unit selection, but also perform accurate processing at high processing speed. The unit selection synthesis method and the parameter synthesis method can be performed separately or in combination to generate a speech audio output.

The parameter speech synthesis may be performed as follows. The TTS module 170 may include an acoustic model capable of converting a symbolic linguistic representation into a synthetic acoustic waveform of a text input based on audio signal manipulation. The acoustic model may include rules which can be used by the parameter synthesis engine 175 in order to assign specific audio waveform parameters to input speech units and/or prosodic annotations. The rules may be used to calculate a score indicating the likelihood that particular audio output parameters (frequency, volume and the like) will correspond to a part of the input symbolic linguistic representation from the front end unit 171.

The parameter synthesis engine 175 may apply a plurality of techniques in order to match the speech to be synthesized with the input speech unit and/or the prosodic annotation. One of the general technologies uses a hidden Markov model (HMM). The HMM can be used to determine the probability that the audio output should match the text input. The HMM can be used to convert parameters of a language and an acoustic space into parameters to be used by a vocoder (digital voice encoder) to artificially synthesize the desired speech.

The TTS device 100 may include the speech unit database for use in the unit selection.

The speech unit database may be stored in the TTS storage 180, the storage 160, or other storage configurations. The speech unit database may include recorded speech utterance. The speech utterance may be text corresponding to an utterance content. In addition, the speech unit database may include recorded speech (in the form of audio waveforms, feature vectors or other formats) which takes up a significant storage space in the TTS device 100. Unit samples of the speech unit database can be classified in various ways including speech units (phonemes, di-phones, words and the like), linguistic prosodic labels, acoustic feature sequences, speaker identities and the like. Sample utterance can be used to generate a mathematical model corresponding to the desired audio output for a particular speech unit.

The speech synthesis engine 172 may select a unit in the speech unit database that most closely matches the input text (including both the speech units and the prosodic symbol annotations) when matching the symbolic linguistic representation. In general, the larger the speech unit database, the greater the number of selectable unit samples, thereby enabling the accurate speech output.

Audio waveforms including the speech output from the TTS module 213 may be transmitted to the audio output device 110 to be output to a user. Audio waveforms including speech may be stored in a plurality of different formats, such as a series of feature vectors, uncompressed audio data, or compressed audio data. For example, the speech output may be encoded and/or compressed by an encoder/decoder before being transmitted. The encoder/decoder may encode and decode audio data such as digitized audio data and feature vectors. In addition, the function of the encoder/decoder may be located in a separate component or may be performed by the processor 140 and the TTS module 170.

Meanwhile, the TTS storage 180 may store other information for speech recognition.

The content of the TTS storage 180 may be prepared for general TTS use and may be customized to include sounds and words that are likely to be used in a particular applications. For example, for the TTS processing by the GPS device, the TTS storage 180 may include custom speech specialized for position and navigation.

In addition, for example, the TTS storage 180 may be customized to a user based on personalized desired speech output. For example, a user may prefer a specific gender, a specific accent, a specific speed, and a specific emotion (for example, happy speech) for the output speech. The speech synthesis engine 172 may include a specialized database or model to describe such user preferences.

The TTS device 100 may also be configured to perform the TTS processing in multiple languages. For each language, the TTS module 170 may include data, commands, and/or components specifically configured to synthesize speech in the desired language.

To improve the performance, the TTS module 213 can modify or update the content of the TTS storage 180 based on the feedback on the results of the TTS processing, so that the TTS module 170 may improve the speech recognition beyond capabilities provided by training corpus.

As the processing capability of the TTS device 100 is improved, speech may be output while reflecting an emotion property of the input text. Alternatively, even if the input text is not included in the emotion attribute, the TTS device 100 may output speech while reflecting a user intent (emotion information) who creates the input text.

Indeed, when a model which will be integrated into the TTS module performing the TTS processing is constructed, the TTS system may integrate various components mentioned above with other components. For example, the TTS device 100 may insert emotion factors into speech.

The TTS device 100 may include an emotion insertion module 177 to output the speech to which the emotion information is added. The emotion insertion module 177 may be integrated into the TTS module 170 or as part of the front end unit 171 or the speech synthesis engine 172. The emotion insertion module 177 may implement the speech synthesis based on the emotion information using metadata corresponding to the emotion attribute. According to an embodiment of the present invention, the metadata may use a markup language, and preferably a speech synthesis markup language (SSML). The speech synthesis method based on the emotion information through the SSML format will be described in detail below.

As to the Present Invention

When a specific speaker and a plurality of recipients exist in a specific space, a speech command that the speaker utters to the plurality of recipients may be difficult to be transmitted to the plurality of recipients.

When two or more members exist in a specific space, the 'speaker' refers to a member who transmits a speech command to all other members except myself, and a recipient refers to the other members who receive the speech command. The same shall apply hereinafter.

When a speech command is difficult to be transmitted to a recipient, for example, when a specific speaker existing in a specific space transmits a speech command to a plurality of recipients, the size of the specific space may be so large that the plurality of recipients cannot receive the speech command.

That is, since the position of the speaker and the positions of the plurality of recipients are far from each other, it may be difficult for the speech command of the speaker to be transmitted to the plurality of recipients.

As another example, when a specific speaker existing in a specific space transmits a speech command to a plurality of recipients, the plurality of recipients may not receive the speech command due to special situations. The special situations may be a case in which the speaker cannot transmit a speech command to the plurality of other recipients aloud due to an emergency situation.

In addition to the above cases, there may be various cases in which a speech command uttered by a specific speaker in a specific space of a certain size is difficult to be transmitted to a plurality of recipients.

Therefore, even when the speech command that the speaker utters to the plurality of recipients may be difficult to be transmitted to the plurality of recipients in a specific space in which a specific speaker and a plurality of recipients exist, there is a need to smoothly transmit a speech command to the plurality of recipients.

The present invention provides a speech processing method using an artificial intelligence (AI) device that allows a speech command to be smoothly transmitted to a plurality of recipients even when a speech command that a specific speaker in a specific space utters to a plurality of recipients is difficult to be transmitted to the plurality of recipients.

More specifically, the present invention provides a speech processing method using an artificial intelligence (AI) device notifying that there is a speech command of a specific speaker to a second AI device by allowing a first AI device which is closest to a position of the speaker to grasp whether there is at least one specific recipient who does not receive the speech command among a plurality of recipients and then to grasp at least one second AI device closest to at least one specific recipient who does not receive the speech command, when a specific speaker and a plurality of recipients exist in a specific space and the specific speaker transmits the speech command to the plurality of recipients.

The AI device may be various devices including an AI processor, and may be an AI speaker, an AI monitor or the like. Also, the AI device may include an output unit, and the output unit may include a display or a speaker.

A speaker may transmit a speech command to all of a plurality of recipients in a specific space (case 1), or may transmit a speech command only to at least one specific recipient of the plurality of recipients (case 2).

In addition, when a speaker transmits a speech command to all of the plurality of recipients, all of the plurality of recipients receive the speech command (case 1-1), or only some of the plurality of recipients receive the speech command (case 1-2) or all of the plurality of recipients may not receive the speech command (case 1-3).

In addition, when a speaker transmits a speech command only to at least one specific recipients among the plurality of recipients, all of at least one specific recipients receive the speech command (case 2-1), only some of the at least one specific recipients receive the speech command (case 2-2), or all of the at least one specific recipients may not receive the speech command (case 2-3).

The present invention can be applied to both the (case 1-1 to case 1-3) and the (case 2-1 to case 2-3).

The specific space to which the method provided by the present invention is applied may be an opened space or a sealed space. When the specific space is the sealed space, the specific space may be a home, a vehicle or the like, and in addition to the above examples, there may be a specific space which is various sealed spaces to which the present invention may be applied.

Hereinafter, the case in which the speech command which the specific speaker utters to the plurality of recipients in a specific space is difficult to be transmitted to the plurality of recipients includes both the case in which it is difficult to transmit the speech command to the plurality of recipients because the position of the specific speaker and the position of the plurality of recipients are far from each other and the case in which the specific speaker is difficult to transmit the speech command to the plurality of recipients aloud due to the special situations.

Hereinafter, for convenience of description, the specific space is a sealed space, and the description will be given based on the case in which it is difficult to transmit a speech command because the position of the speaker and the position of the at least one recipient are far from each other, but the present invention is limited thereto.

Figure 7:
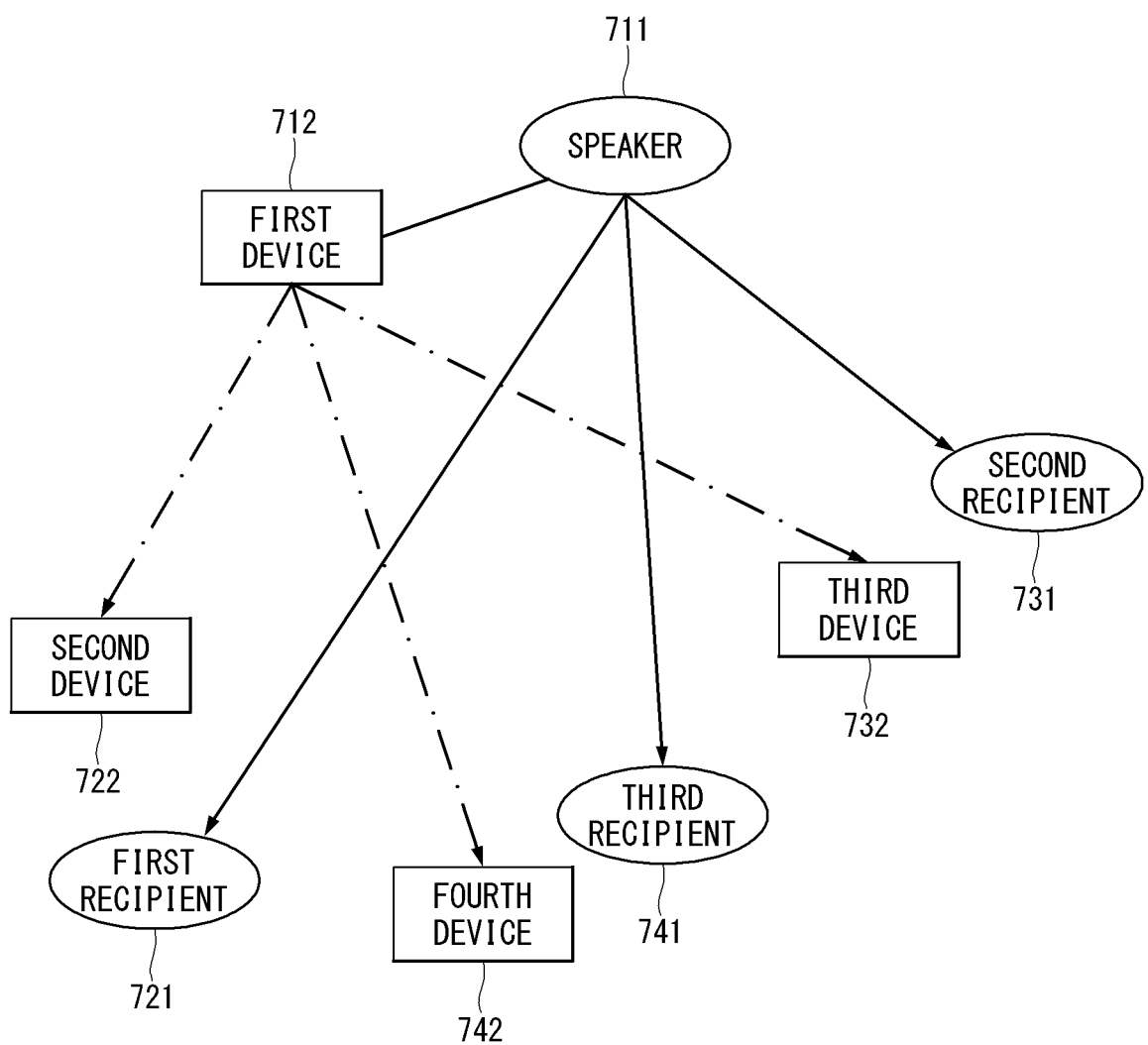
FIG. 7 is a diagram illustrating an example of a system for performing a speech processing method using an AI device according to an embodiment of the present invention.

FIG. 7 is a diagram illustrating an example of a system for performing a speech processing method using an AI device according to an embodiment of the present invention.

FIG. 7 illustrates a speaker and first to third recipients (at least one recipient) and first to fourth devices.

In FIG. 7, the first device is the device closest to the position of the speaker, and the second to fourth devices are the closest devices from the positions of the first to third recipient.

The speaker may transmit a speech command to some or all of the first to third recipients.

The first to third recipients may or may not receive the speech command.

The first device may grasp whether the first to third recipients have received the speech command, select a device closest to the recipient who does not receive the speech command, and transmit a message notifying that there is the speech command transmitted from the speaker to the closest device (second to fourth devices).

The second to fourth devices receive a notification message from the first device, the second device notifies the first recipient that there is the speech command transmitted from the speaker, the third device notifies the second recipient that there is the speech command transmitted from the speaker, and the fourth device notifies the third recipient that there is the speech command transmitted from the speaker.

The speech processing method using an AI device provided in the present invention is performed as described above on each component constituting the system.

Hereinafter, for convenience of description, a device closest to a speaker will be referred to as a 'first device', and the speech processing method using an AI device provided in the present invention will be described based on the operation of the first device, but the present invention is not limited thereto.

In addition, hereinafter, for convenience of description, when a speaker transmits a speech command to at least one recipient, it is assumed that a recipient who receives the speech command among the at least one recipients essentially provides feedback on the speech command. That is, the case in which the recipient who receives the speech command among the at least one recipients does not transmit feedback to the speaker even if the recipient receives the speech command is not considered.

Hereinafter, the speech processing method using an AI device provided in the present invention which is performed in the first device which is the closest device to the speaker will be described in more detail below.

Figure 8:
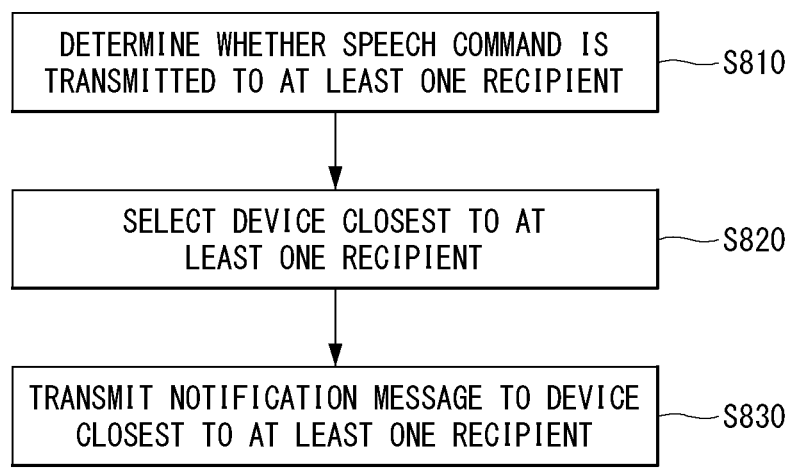
FIG. 8 is a flowchart illustrating an example of performing a speech processing method using an AI device according to an embodiment of the present invention.

FIG. 8 is a flowchart illustrating an example of a speech processing method using an AI device according to an embodiment of the present invention.

FIG. 8 schematically illustrates an operation performed in a first device to provide the speech processing method using an AI device.

First, the first device determines whether a speech command is transmitted to at least one recipient (S810).

Whether the speech command has been transmitted to the at least one recipient may be determined based on whether the first device receives feedback from the at least one recipient. A more detailed description of whether the speech command is transmitted to the at least one recipient will be described below.

The first device may select the device closest to the at least one recipient based on a result of determining whether the speech command is transmitted to at least one recipient (S820).

Specifically, when it is determined that the speech command is transmitted to at least one recipient, the first device may stop the operation.

Alternatively, if it is determined that the speech command is not transmitted to at least one recipient, the first device selects the device closest to the at least one recipient. At this time, the device may be one or more depending on the number of recipients who do not receive the speech command.

A detailed method of allowing the first device to select the device closest to the at least one recipient will be described below.

The first device that selects the device closest to the at least one recipient transmits a notification message to the device closest to the at least one recipient (S830).

The notification message may include information notifying that there is the speech command transmitted from the speaker to at least one specific recipient who does not receive the speech command among the at least one recipients.

The information may be a result of performing the automatic speech recognition (ASR) on the speech command transmitted from the speaker, or may be the speech command itself which is transmitted from the speaker.

Hereinafter, the above-described steps S810 to S830 will be described in detail with reference to FIGS. 9 to 11.

Figure 9:
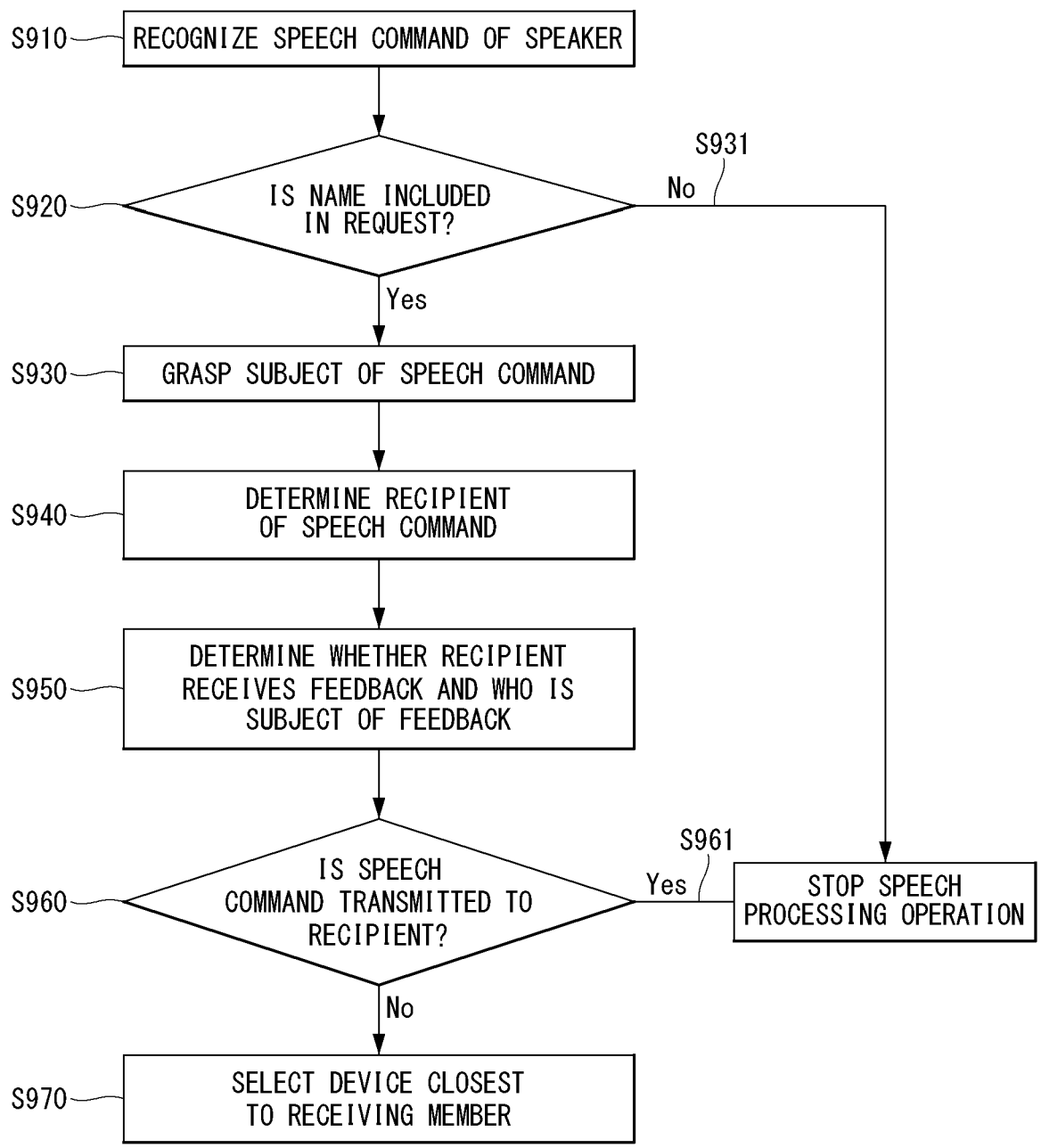
FIG. 9 is a flowchart illustrating an example of performing a speech processing method using an AI device according to an embodiment of the present invention.

FIG. 9 is a flowchart illustrating an example of a speech processing method using an AI device according to an embodiment of the present invention.

Although not shown in FIG. 9, steps after S920 in FIG. 9 are performed when there is a speech command of a speaker. That is, if there is no speech command of the speaker, steps after S920 may not be performed.

First, the first device recognizes (or receives) a speech command of a speaker (S910). Here, the first device does not determine a command subject of the recognized speech command. In other words, the first device does not determine who is the subject of the recognized speech command, but determines that there is only the speech command transmitted from the speaker to the at least one recipient.

If the speech command of the speaker is not recognized, the first device stays in step S910 without performing the next step.

After recognizing the speech command of the speaker, the first device determines whether the recognized speech command includes a recipient's name of the speech command (S920).

It may be determined whether the speech command is included in a speech command through a speech analysis determination model and/or an utterance analysis determination model.

A and/or B means at least one of A or B and is as follows.

The speech analysis determination model refers to a model capable of recognizing the received speech and analyzing the recognized speech size. In detail, the speech analysis determination model may recognize a speech command transmitted from a speaker to a recipient by using the automatic speech recognition (ASR) technology and analyze the size of the recognized speech command.

The speech analysis model refers to a model for analyzing the content of the recognized speech. More specifically, it is possible to determine whether the speech command includes a name by textualizing the speech by applying a speech to text (STT) technology to the speech recognized through the ASR.

In operation S920, when the first device determines that the recognized speech command does not include a name, the first device may stop the speech processing operation (S931).

On the other hand, when the first device determines in S820 that the name is included in the recognized speech command, the first device determines the subject of the speech command transmitted to the recipient (S930). That is, it is determined who is a member who has uttered the speech command among the members existing in the specific space.

The subject of the speech command transmitted to the recipient can be determined based on a member speech discrimination model in the first device.

The recipient speech discrimination model refers to a model capable of recognizing a received speech command and discriminating the subject of the speech command based on the recognized speech command. More specifically, the member speech discrimination model may recognize a speech command through the ASR technology, and discriminate the subject of the speech command by applying the speech discrimination technology based on a speech characteristic to the recognized speech.

In addition, the member speech discrimination model may list and store information on speeches of members (including speakers and recipients) in a specific space. Information in which information on speech of a speaker and at least one recipient is listed refers to 'member speech list information'.

Specifically, the member speech discrimination model may recognize the speech command of the speaker through the ASR technology, and analyze who is the subject of the speech command by applying the speech discrimination technology using the speech characteristic based on the member speech list information.

The first device, which grasps the subject of the speech command, determines the recipient of the speech command by using the name recognized in step S920 (S940).

The recipient of the speech command may be determined through a reinforcement learning model in the first device.

The reinforcement learning model refers to a model capable of determining a recipient who receives a speech command of a speaker through a recognized name based on pre-input information and/or self reinforcement learning. Specifically, the reinforcement learning model may receive names of all members (including a speaker and at least one recipient receiving the speech command of the speaker) in a specific space and list and store the names of all members, and may determine the recipient of the speech command based on the listed information and the recognized name. The listed information will be expressed as 'pre-input member name list information'.

Alternatively, the reinforcement learning model may list and store names of all members in a specific space through self-learning, and may determine a recipient of a speech command based on pre-learned and stored information and recognized names. The pre-learned and stored name information is referred to as "pre-learning member name list information."

As an example of a process of determining a recipient, if a name recognized by a first device based on a speech command of a speaker is A and a specific member's name is stored as A in the pre-input member name list information and/or the pre-learning member name list information, the first device may determine the recipient of the speech command as the specific member.

For convenience of description, this will be described in the order in which the first device grasps the subject of the speech command (S930) and then determines the recipient of the speech command (S940), but the order of the S930 and the S940 may be changed or the S930 and the S940 may be performed simultaneously.

Next, the first device grasps whether the recipient receives the feedback (response) and the subject of the feedback (S950). That is, it is grasped whether there is the feedback of the recipient to the speech command transmitted from the speaker, and who is the subject of the received feedback if there is the received feedback. In this case, when there are a plurality of recipients, the feedback may be at least one.

It may be determined whether the feedback of the recipient is received through the speech model inside the first device. The speech model refers to a model capable of determining whether a recipient receives feedback and who is a subject of feedback based on the recipient's speech recognition, the recipient's speech size, and the recipient's speech discrimination. The speech model may be a model in which the function of the speech analysis determination model described above and the function of the recipient speech discrimination model are combined.

Figure 10:
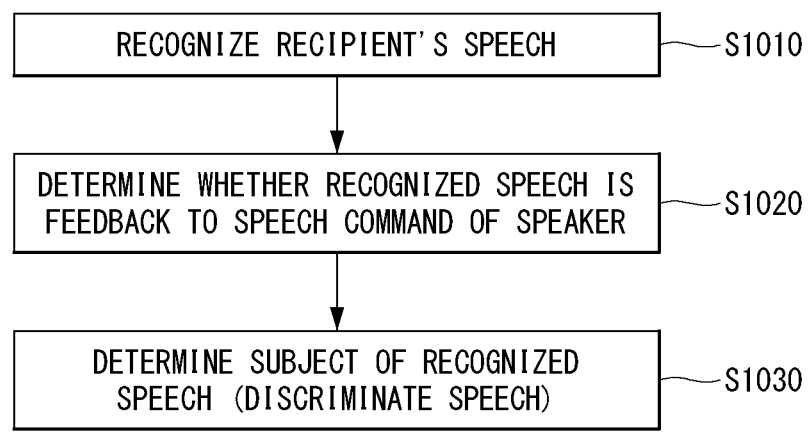
FIG. 10 is a flowchart illustrating an example of performing a speech processing method using an AI device according to an embodiment of the present invention.

FIG. 10 is a flowchart illustrating an example of a speech processing method using an AI device according to an embodiment of the present invention.

FIG. 10 illustrates in more detail the step of determining whether a recipient receives feedback and who is a subject of the feedback subject in FIG. 9.

The speech model in the first device can recognize a recipient's speech by applying the automatic speech recognition (ASR) technology. The recognized recipient's speech may not be feedback to a speech command.

In other words, the speech model simply recognizes only the recipient's speech regardless of whether the speech recognized through the ASR is the feedback to the speech command. In the next steps (S1020 to S1030), it is determined whether the recognized speech is feedback to a speech command.

The speech model which recognizes the speech may determine if the recognized speech is feedback to a speech command of a speaker based on the speech size only (Case 1), or determine whether the recognized speech is the feedback to the speech command of the speaker based on both the speech size and the speech discrimination (Case 2) (S1020).

First, Case 1 will be described. In Case 1, to determine if the recognized speech is the feedback to the speech command of the speaker, the speech model can be preset to a fixed specific value.

In this case, the speech model may determine that the recognized speech is not the feedback to the speech command of the speaker if the recognized speech size is smaller than the specific value. On the other hand, the speech model may determine that the recognized speech is the feedback to the speech command of the speaker if the recognized speech size is equal to or greater than the specific value.

Thereafter, it is possible to determine the subject of the feedback recognized by applying the speech discrimination technology to the speech determined to be the feedback to the speech command of the speaker in the recognized speech (S1030).

Next, Case 2 will be described. In Case 2, to determine if the recognized speech is the feedback to the speech command of the speaker, the speech model can be set to a variable specific value.

In this case, the speech model can determine that the recognized speech is not the feedback to the speech command of the speaker if the recognized speech size is smaller than the variable specific value. On the other hand, the speech model may determine that the recognized speech is the feedback to the speech command of the speaker if the recognized speech size is equal to or greater than the variable specific value.

The variable specific value can vary based on the position of the recipient. More specifically, positions of all members in a specific space are always monitored by a monitoring device existing in a specific space, and the first device may receive the positional information of the monitored members from the monitoring device.

Based on the received positional information of the members, the first device may set the variable specific value for determining whether the recognized speech is the feedback to the speech command differently for each member. it can. Also, the specific value can be set for one specific member differently in real time according to the varying position of the member.

The variable specific value may be set according to specific criteria. For example, when a distance between the position of the first device and the member is far, the specific value is set to a small value, and when the distance between the position of the first device and the member is short, the specific value can be set to a large value.

In Case 2, in order to determine whether the recognized speech is feedback by using the set variable specific value, the speech discrimination technology of the speech model should be applied together.

That is, since the set variable specific value itself can be individually set for each member, the speech discrimination technology may be applied to determine who is the subject of the recognized speech, grasp the set specific value corresponding to the determined subject, and then determine whether the recognized speech is the feedback.

Therefore, in Case 2, the steps S1030 and S1020 can be performed simultaneously, or the step S1030 may be performed before the step S1020.

As an example, the first device may set a specific value to 20 for the first recipient and a specific value to 25 for the second recipient. Next, the first device may recognize first recipient's speech 1 and second recipient's speech 2. Here, the sizes of the speech 1 and the speech 2 are 24.

The speech model in the first device applies the speech discrimination technology to the recognized speech 1 and speech 2 to understand that a subject of the speech 1 is a first recipient and a subject of the speech 2 is a second recipient. In order to determine whether the speech 1 and the speech 2 are the feedback to the speech command of the speaker, the speech model compares 20 which is a specific value set for the first recipient with the size of the speech 1 and compares 25 which is a specific value set for the second recipient with the size of the speech 2.

Since the size 24 of the speech 1 is greater than the set specific value 20, it is determined that the speech 1 is the feedback to the speech command of the speaker. On the other hand, since the size 24 of the speech 2 is smaller than the set specific value 25, it is determined that the speech 2 is not the feedback to the speech command of the speaker.

In addition, the first device may consider a direction of the recognized speech in order to determine whether the feedback is received and who is the subject of the feedback.

As in Case 1 and Case 2, by determining the presence or absence of feedback based on the set specific value, the speech of the specific member having no relation to the speech command of the speaker is recognized as the feedback, thereby preventing the speaker from failing to transmit the speech command.

In addition, in Case 2, the above effect can be further increased for each member by changing the value set for each member and according to the positions of the members.

Referring back to FIG. 8, the speech model may list and store information on speeches of all members of a specific space in order to apply the speech discrimination technique. The members include a speaker and recipients.

Information in which information on speech of a speaker and at least one recipient is listed refers to 'member speech list information'.

In summary, the speech model in the first device receives a response of at least one recipient who receives the speech command of the speaker, and determines whether to receive the feedback and who is the subject of the feedback based on the speech recognition, the speech size, and the recipient speech list information.

'Based on the speech recognition and the speech size of the recipient, and the recipient speech list information' may be expressed as 'based on the recipient speech characteristic'.

In addition, the speech characteristic may include a speech accent, a speech tone, a speech height and the like of the recipient.

Based on the results in the above S930 to S950, the first device determines whether the speech command transmitted from the speaker to the recipient is transmitted (S960).

It may be determined whether the speech command is transmitted to the recipient through a text correspondence analysis model.

The text correspondence analysis model refers to a model capable of matching a text converted from the specific speech to a specific target text by applying a speech to text (STT) technology to a recognized specific speech.

If it is determined that the speech command is transmitted to the recipient as a result of determining whether the speech command is transmitted, the first device stops the speech processing operation (S961).

On the other hand, if it is determined that the speech command is not transmitted to the recipient as a result of determining whether the speech command is transmitted, the first device selects a device closest to the recipient (S970).

If there are a plurality of recipients, the first device stops the speech processing operation only when all the recipients have performed the speech command.

For example, if the speaker has transmitted a speech command to the first to third recipients, and only the first and third recipients have received the speech command, the device does not stop operation and is a device closest to the second recipient.

The step S970 will be described in more detail below.

Figure 11:
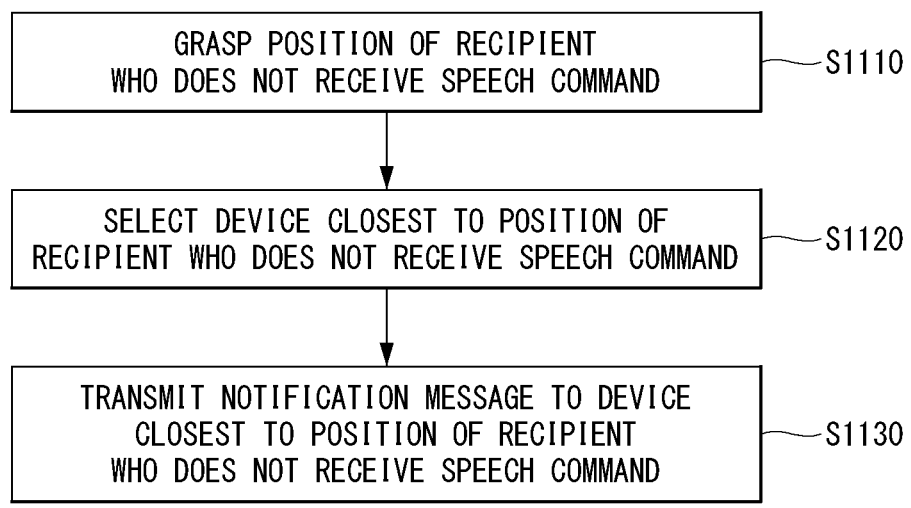
FIG. 11 is a flowchart illustrating an example of performing a speech processing method using an AI device according to an embodiment of the present invention.

FIG. 11 is a flowchart illustrating an example of a speech processing method using an AI device according to an embodiment of the present invention.

Referring to FIG. 11, an operation of allowing the first device to select a device closest to a position of a recipient who does not receive a speech command will be described in more detail.

The first device determines a position of the recipient who does not receive the speech command (S1110).

The first device may determine the position of the recipient who does not receive the speech command through a sensor-based positioning module.

The sensor-based positioning module means a module which grasps the position of the one or more specific recipient based on at least one the speech of the recipient who does not receive the speech command, a distance between the first device and the recipient who does not receive the speech command, or sensitivity of a signal received from a device carried by the recipient who does not receive the speech command. The sensor-based positioning module may include a speech sensor, a distance sensor, and a received signal sensitivity measurement sensor.

The device (hereinafter, referred to as a portable device) carried by the recipient who does not receive the speech command is a device different from the device on which the method provided by the present invention is performed, and may include a mobile phone and may all devices capable of transmitting a specific signal.

The sensor-based positioning module may detect the speech of the recipient who does not receive the speech command through the speech sensor, grasp the distance from the recipient who does not receive the speech command, and grasp the sensitivity of the received signal from the portable device of the recipient who does not receive the speech command through the received signal sensitivity measurement sensor. As a result, the first device may grasp the position of the recipient who does not receive the speech command.

The first device which grasps the position of the recipient who does not receive the speech command selects the device closest to the position of the recipient who does not receive the speech command (S1120).

The device closest to the position of the recipient who does not receive the speech command may be selected through the list/sensor based selection module of the first device.

The list/sensor based position module refers to a module that can grasp positions of all devices existing in a specific space through the distance sensor, and list and store the grasped positions of all the devices. The listed and stored positional information of the devices may be referred to as device position list information. The list/sensor based positioning module may include the distance sensor.

In detail, the list/sensor-based selection module may select the device closest to the position of the recipient who does not receive the speech command based on the device position list information and the positional information of the recipient who does not receive the speech command.

The first device which selects the device closest to the position of the recipient who does not receive the speech command transmits a notification message to the closest device (S1130).

The notification message may include information (hereinafter, notification information) for notifying the recipient who does not receive the speech command that there is the speech command transmitted from the speaker and/or control information for controlling the closest device.

For example, the notification information may be a result of performing the automatic speech recognition (ASR) and the speech to text (SST) on the speech command transmitted from the speaker, or may be the speech command itself which is transmitted from the speaker. In addition, the notification information may include information that notifies the recipient who does not receive the speech command that there is the speech command of the speaker and notifies the recipient who does not receive the speech command that the recipient does not perform a response thereto. The control information may instruct a specific operation to the closest device. Specifically, the output unit included in the closest device may be controlled to output the notification information. The output unit may include a display, a speaker or the like.

The closest device which receives the notification message may notify the recipient who does not receive the speech command that there is the speech command of the speaker based on the notification information and/or the control information included in the notification message. In this case, when the notification information is the results of performing the ASR and the SST on the speech command, the closest device may perform a text to speech (TTS) on the notification information to output the notification information. In detail, the speech command may convert the textualized information into the speech information, and transmit the speech command to the recipient who does not receive the speech command. On the other hand, when the notification information is the speech command itself, the closest device may output the notification information itself. In this case, a file in which the speaker's speech is recorded may be output through the output unit (for example, a speaker) of the closest device.

In addition, the first device may receive a response message to the notification message from the device closest to the recipient who does not receive the speech command. The response message may include information indicating that the closest device receives the notification message.

The first device can receive the response message to check that the closest device receives the notification message from the position of the recipient who does not receive the speech command.

In addition, the first device may receive the response message to notify the speaker that the speech command of the speaker is also transmitted to the recipient who does not receive the speech command.

Accordingly, the speaker can check that his/her speech command has been transmitted to the recipient, and there is the effect that the speaker does not utter an additional speech command unnecessarily.

Figure 12:
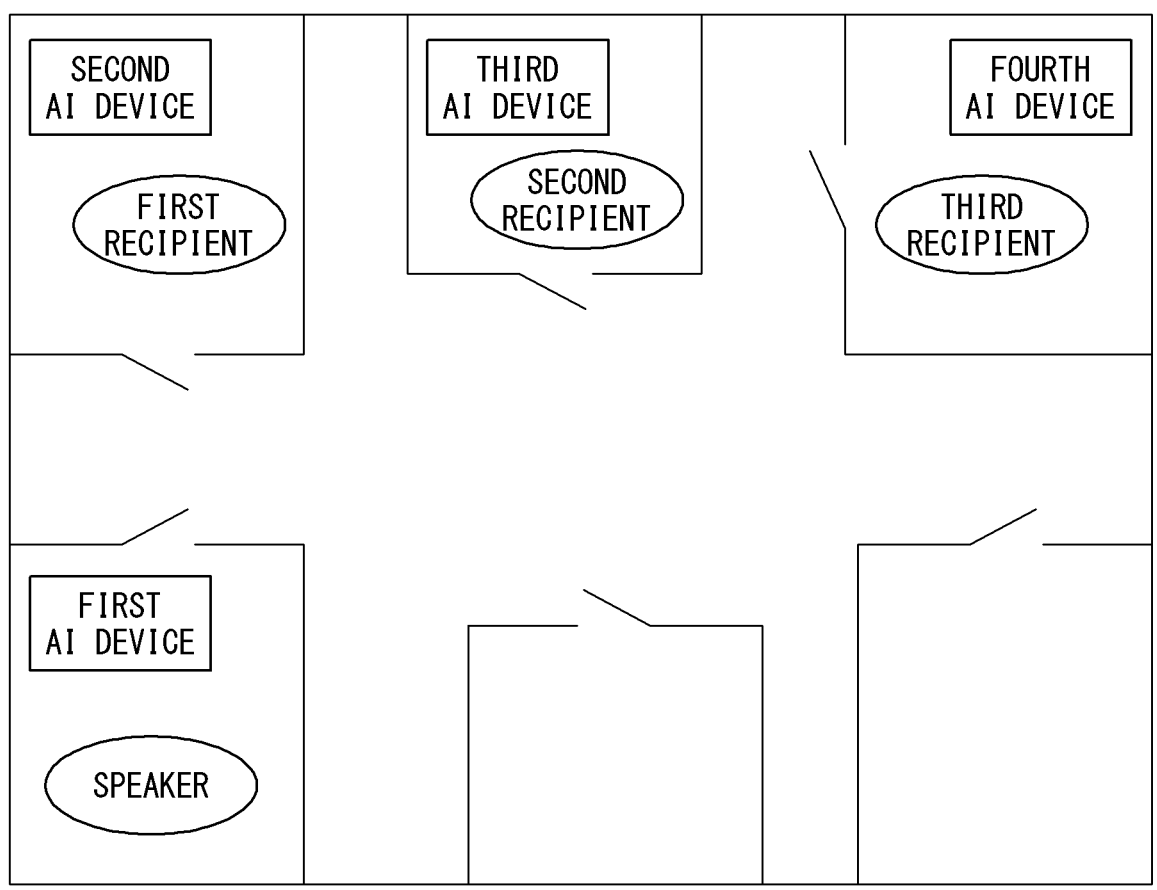
FIG. 12 is diagram illustrating an example of a specific space in which the speech processing method using an AI device according to the embodiment of the present invention is performed.

FIG. 12 is diagram illustrating an example of a specific space in which the speech processing method using an AI device according to the embodiment of the present invention is performed.

FIG. 12 illustrates a case in which a plurality of recipients receiving a speech command of a speaker exists in a specific space. FIG. 11 illustrates three recipients, and when there are a plurality of recipients receiving the speech command of the speaker in the specific space, the method provided by the present invention may be performed as follows in the first device.

First, the first device recognizes the speech command of the speaker. Here, if there is no speech command of the speaker, the first device may not recognize the speech command and may not perform an operation related to the method provided by the present invention.

The speech command may be for at least one of the first to third recipients, but for the convenience of description, the speech command is a speech command for all of the first to third recipients.

After recognizing the speech command of the speaker, the first device determines whether the recognized speech command includes the recipient's name of the speech command.

It may be determined whether the speech command is included in a speech command through a speech analysis determination model and/or an utterance analysis determination model.

In detail, the speech analysis determination model may recognize the speech command transmitted from the speaker to the recipient by using the automatic speech recognition (ASR) technology and analyze the size of the recognized speech command.

When the first device determines that the recognized speech command does not include a name, the first device may stop the speech processing operation.

On the other hand, when the first device determines that the name is included in the recognized speech command, the first device determines the subject of the speech command transmitted to the recipient. The first device may determine that the subject of the speech command is the speaker illustrated in FIG. 11.

The first device may list and store information on speeches of the speaker and the first to third recipients. The listed information is expressed as 'member speech list information'.

The first device, which grasps the subject of the speech command, determines the recipient of the speech command by using the recognized name.

The recipient of the speech command may be determined through a reinforcement learning model in the first device. The first device may determine the recipient based on the pre-input member name list information and/or the pre-learning member name list information.

Since the speech command is for both the first to third recipients, the first device may determine that the recipient of the speech command is the first to third recipients.

For convenience of description, the order that the first device grasps the subject of the speech command and determines the recipient of the speech command is described, but the order of the operations of determining the subject and the recipient of the speech command may be changed or may be performed simultaneously.

Next, the first device determines whether the first to third recipients receive the feedback and who is the subject of the feedback. That is, it is grasped whether there is the feedback of the first to third recipients to the speech command transmitted from the speaker, and who is the subject of the received feedback if there is the received feedback.

It may be determined whether the feedback of the first to third recipients is received through the speech model inside the first device.

As a result that the first device determines whether the feedback is received and who is the subject of the feedback, when it is determined that only the feedback of the first recipient and the second recipient of the first to third recipients is received, the first device determines that the second recipient does not receive the speech command.

In addition, the first device determines that the first and second recipients have received the speech command, and stops the speaker processing operation for the first and second recipients.

Next, the first device grasps the position of the second recipient. The sensor-based positioning module of the first device may be used to grasp the position of the second recipient.

More specifically, the first device may detect the speech of the second recipient, determine the distance from the second recipient, and grasp the sensitivity of the signal received from the portable device of the second recipient. As a result, the first device may grasp the position of the second recipient.

The first device that has grasped the second recipient selects a fourth device that is the device closest to the second recipient.

The first device may grasp the positions of all devices existing in the specific space through the list/sensor-based positioning module inside the first device, and may list and store the grasped positions.

The first device may select the fourth device based on the positional information of all the listed devices and the positional information of the second recipient.

The first device, which has selected the fourth device, transmits a notification message to the fourth device.

The notification message may include information notifying the second recipient that there is the speech command transmitted from the speaker.

The information may be a result of performing the automatic speech recognition (ASR) on the speech command transmitted from the speaker, or may be the speech command itself which is transmitted from the speaker.

Figure 13:
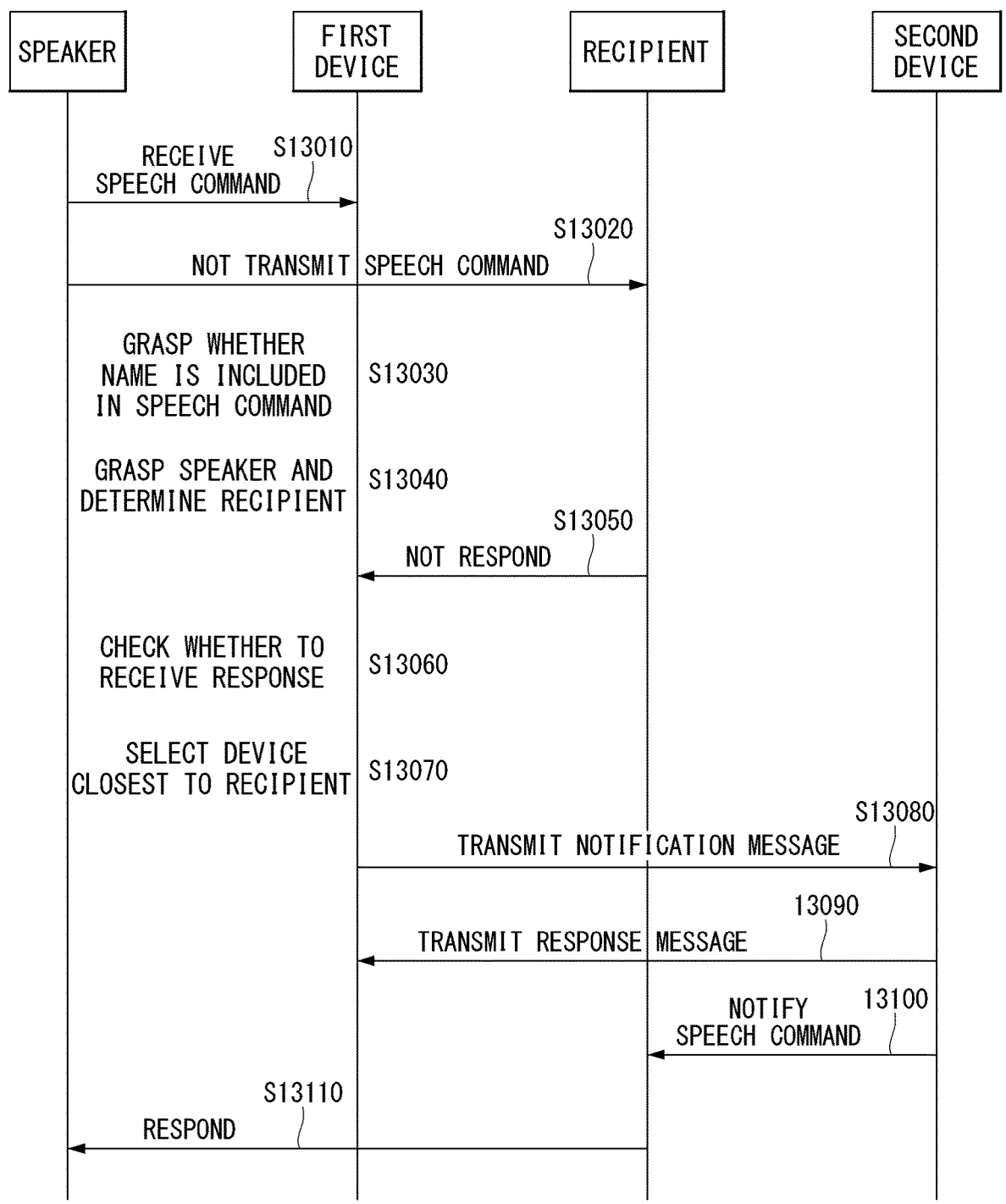
FIG. 13 is an flowchart illustrating an example of performing a speech processing method using an AI device according to an embodiment of the present invention.

FIG. 13 is a flowchart illustrating an example of performing a speech processing method using an AI device according to an embodiment of the present invention.

FIG. 13 specifically illustrates the interaction between the speaker, the recipient, the first device, and the second device.

First, the speaker transmits a speech command to a recipient, and the first device receives the speech command (S1310). At this time, the recipient does not receive the speech command due to the distance from the speaker or the fact that the speaker is in an emergency situation (S1320).

The first device grasps whether a specific name is included in the speech command (S1330), grasps the subject who has uttered the speech command, and determines the recipient of the speech command (S1340).

The first device may grasp that the subject of the speech command is the speaker, and determine the recipient of the speech command by performing the speech recognition operation on the speech command.

In step S1330, if a name is not included in the speech command, the first device may stop the operation.

In addition, the first device may perform steps S1330 and S1340 simultaneously in the first device, or the order of the steps S1330 and S1340 may be changed.

Since the recipient did not receive the speech command, the recipient does not respond to the speech command (S1350).

The first device determines whether there is a response to the speech command (S1360), and since the recipient did not respond, the first device determines that there is no response.

The first device determining that there is no response determines that the speech command is not transmitted to the recipient, and selects a device positioned closest to the position of the recipient (S1370).

The first device selects the second device and transmits a notification message notifying that there is the speech command of the speaker to the second device (S1380).

The second device receiving the notification message may transmit a response message to the first device (S1390). The response message may include information indicating that a notification message is received.

The second device receiving the notification message notifies the recipient that there is the speech command (S13100).

Since the recipient has learned that there is the speech command of the speaker through the second device, the recipient may respond to the speech command (S13110).

Figure 14:
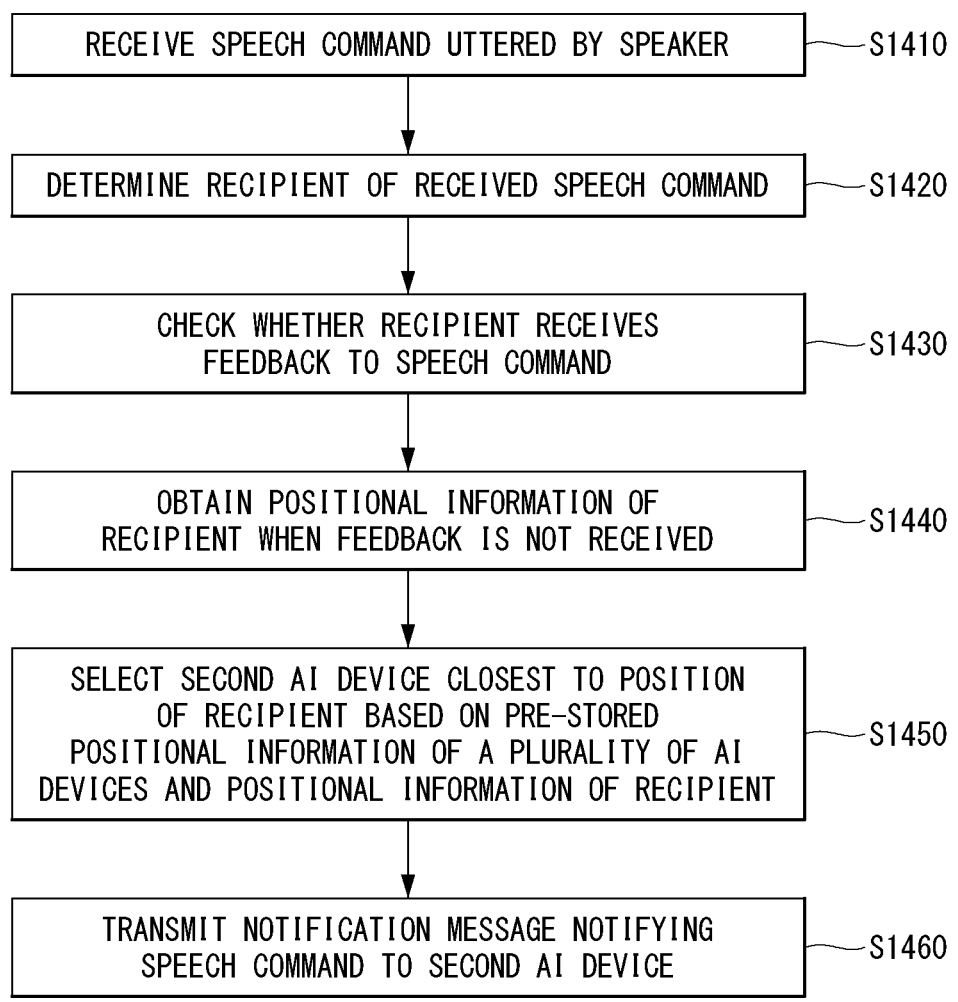
FIG. 14 is an flowchart illustrating an example of performing the speech processing method using an AI device according to the embodiment of the present invention.

FIG. 14 is a flowchart illustrating an example of a speech processing method using an AI device according to an embodiment of the present invention.

FIG. 14 illustrates an example of an operation in which the speech processing method using an AI device described above with reference to FIGS. 1 to 13 is performed in the first device which is the device closest to the speaker.

In a space in which a speaker, at least one recipient who receives a speech command uttered by the speaker, and a plurality of AI devices which perform speech interactions with the speaker and the at least one recipient, respectively, are positioned, the first device receives the speech command uttered by the speaker (S1410).

Next, the first device performs the speech recognition operation on the received speech command to determine at least one specific recipient of the speech command (S1420).

Next, the first device checks whether at least one feedback corresponding to the speech command is received from the at least one specific recipient (S1430).

Next, when there is feedback that is not received among the at least one feedbacks, the first device obtains positional information of the recipient who does not transmit at least one feedback among the at least one specific recipients (S1440).

Thereafter, the first device selects at least one second AI device closest to a position of a recipient who does not transmit the at least one feedback among the specific recipients based on the pre-stored positional information of the plurality of AI devices in the space and the positional information of the recipient who does not transmit the at least one feedback (S1450).

Finally, the first device transmits the notification message notifying that there is the speech command to the at least one second device (S1460).

The present invention described above can be embodied as a computer readable code on a medium in which a program is recorded. A computer readable medium includes all types of recording devices in which of data that may be read by a computer system are stored. Examples of the computer readable medium may include a hard disk drive (HDD), a solid state disk (SSD), a silicon disk drive (SDD), a ROM, a RAM, a CD-ROM, a magnetic tape, a floppy disk, an optical data storage or the like, and also include a medium implemented in a form of a carrier wave (for example, transmission through the Internet). Therefore, the above-mentioned detailed description is to be interpreted as being illustrative rather than being restrictive in all aspects. The scope of the present invention is to be determined by reasonable interpretation of the claims, and all modifications within an equivalent range of the present disclosure fall in the scope of the present disclosure.

According to the present invention, the speech command of the speaker can be successfully transmitted to a recipient when the recipient does not receive the speech command of the speaker.

Further, according to the present invention, the AI device can recognize the recipient of the speech command when the recipient does not receive the speech command of the speaker.

In addition, according to the present invention, the AI device can grasp the response of the recipient to the speech command when the recipient does not receive the speech command of the speaker.

Also, according to the present invention, the AI device can select the AI device closest to the recipient when the recipient does not receive the speech command of the speaker.

Effects which can be achieved by the present invention are not limited to the above-mentioned effects. That is, other objects that are not mentioned may be obviously understood by those skilled in the art to which the present invention pertains from the following description.

What is claimed is:

1. A speech processing method using an artificial intelligence (AI) device using a first AI device in a space in which a speaker, at least one recipient who receives a speech command uttered by the speaker, and a plurality of AI devices which perform a speech interaction with the speaker and the at least one recipient are positioned, the speech processing method comprising:
   receiving the speech command uttered by the speaker;
   determining at least one specific recipient of the speech command by performing a speech recognition operation on the received speech command;
   checking whether at least one feedback response corresponding to the speech command is received from the at least one specific recipient;
   obtaining positional information of a recipient who does not transmit the at least one feedback response among the at least one specific recipient when there is feedback which is not received among the at least one feedback response;
   selecting at least one second AI device closest to a position of the recipient who does not transmit the at least one feedback response based on pre-stored positional information of the plurality of AI devices in the space and the positional information of the recipient who does not transmit the at least one feedback response; and
   transmitting a notification message notifying that there is the speech command to the at least one second AI device.

2. The speech processing method of claim 1, wherein the AI device is an AI speaker.

3. The speech processing method of claim 1, wherein the determining of the at least one specific recipient includes:
   performing a speech to text (SST) conversion on the speech command to produce converted text; and
   extracting the at least one specific recipient of the speech command from the converted text.

4. The speech processing method of claim 1, wherein the checking whether the at least one feedback response is received includes recognizing a feedback utterance from the at least one specific recipient, and
   checking whether the at least one feedback response is received from the at least one specific recipient based on a pre-stored speech characteristic of the at least one specific recipient.

5. The speech processing method of claim 4, wherein the speech characteristic includes at least one of a speech size, a speech height, an accent, or a speech tone of the at least one specific recipient.

6. The speech processing method of claim 1, wherein the notification message includes an alarm notifying that there is no feedback corresponding to the speech command.

7. The speech processing method of claim 1, wherein the notification message includes a specific command same as the speech command, and
wherein the specific command is a result of performing automated speech recognition (ASR) on the speech command or speech data itself of the speech command.

8. The speech processing method of claim 1, further comprising:
transmitting, to the at least one second AI device, a control signal to output the notification message through an output unit of the at least one second AI device.

9. The speech processing method of claim 8, wherein the output unit includes at least one of a display or a speaker.

10. The speech processing method of claim 1, wherein the positional information of the recipient who does not transmit the at least one feedback response is obtained based on at least one of a speech of the recipient who does not transmit the at least one feedback response, a distance from the recipient who does not transmit the at least one feedback response, or sensitivity of a signal received from a device carried by the recipient who does not transmit the at least one feedback response.

11. The speech processing method of claim 1, further comprising:
determining whether a name of the at least one specific recipient is included in the speech command.

12. The speech processing method of claim 11, further comprising:
stopping speech processing when it is determined that the name of the at least one specific recipient is not included.

13. The speech processing method of claim 1, further comprising:
stopping speech processing when all of the at least one feedback response are received.

14. The speech processing method of claim 1, further comprising:
determining whether the speaker utters the speech command.

15. The speech processing method of claim 14, wherein the determining whether the speaker utters the speech command includes comparing pre-stored speech information of the speaker and the at least one specific recipient with the speech command.

16. The speech processing method of claim 1, further comprising:
receiving downlink control information (DCI) used to schedule a transmission of the notification message from a network,
wherein the notification message is transmitted to the at least one second AI device based on the DCI.

17. The speech processing method of claim 16, further comprising:
performing an initial access procedure with the network based on a synchronization signal block (SSB).

18. The speech processing method of claim 16, further comprising:
controlling a communication unit to transmit the notification message to an AI processor included in the at least one second AI device; and
controlling the communication unit to receive AI-processed information from the AI processor.

19. An intelligent computing device for supporting a speech processing method using an artificial intelligence (AI) device in a space in which a speaker, at least one recipient who receives a speech command uttered by the speaker, and a plurality of AI devices which perform a speech interaction with the speaker and the at least one recipient are positioned, the intelligent computing device comprising:
a sensing unit including at least one sensor;
a communication unit;
a processor; and
a memory including one or more instructions executable by the processor;
wherein the one or more instructions configure the processor:
to receive a speech command uttered by the speaker, and perform a speech recognition operation on the received speech command to determine at least one specific recipient of the speech command;
to check whether at least one feedback response corresponding to the speech command is received from the at least one specific recipient;
to obtain positional information of a recipient who does not transmit the at least one feedback response among the at least one specific recipient when there is feedback which is not received among the at least one feedback response;
to select at least one second AI device closest to a position of the recipient who does not transmit the at least one feedback response based on pre-stored positional information of the plurality of AI devices in the space and the positional information of the recipient who does not transmit the at least one feedback response; and
to transmit a notification message notifying that there is the speech command to the at least one second AI device.

20. The intelligent computing device of claim 19, wherein the one or more instructions further configure the processor to control the communication unit to transmit the notification message to an AI processor included in the at least one second AI device, and to control the communication unit to receive AI-processed information from the AI processor.

* * * * *